US007526385B2

(12) United States Patent
Sayers

(10) Patent No.: US 7,526,385 B2
(45) Date of Patent: Apr. 28, 2009

(54) METHOD, SYSTEM AND APPARATUS FOR DETERMINING ROCK STRENGTH USING SONIC LOGGING

(75) Inventor: Colin M. Sayers, Katy, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 11/821,451

(22) Filed: Jun. 22, 2007

(65) Prior Publication Data
US 2008/0319675 A1 Dec. 25, 2008

(51) Int. Cl.
*G01V 1/40* (2006.01)
*G06G 7/48* (2006.01)
(52) U.S. Cl. .......................................... 702/13; 703/10
(58) Field of Classification Search ................... 702/13, 702/1–2, 11, 18; 367/73; 703/10
See application file for complete search history.

(56) References Cited

U.S. PATENT DOCUMENTS

| | | | | |
|---|---|---|---|---|
| 4,594,691 | A * | 6/1986 | Kimball et al. | ............... 367/32 |
| 5,309,404 | A * | 5/1994 | Kostek et al. | ................. 367/31 |
| 5,387,767 | A * | 2/1995 | Aron et al. | ..................... 367/25 |
| 5,838,633 | A * | 11/1998 | Sinha | ........................... 367/31 |
| 5,852,587 | A * | 12/1998 | Kostek et al. | ................. 367/25 |
| 6,230,101 | B1 | 5/2001 | Wallis | ......................... 702/16 |
| 6,351,991 | B1 * | 3/2002 | Sinha | ...................... 73/152.01 |
| 6,904,365 | B2 | 6/2005 | Bratton et al. | ................. 702/9 |
| 7,042,802 | B2 * | 5/2006 | Sinha | .......................... 367/86 |

OTHER PUBLICATIONS

Chang, C., Empirical Rock Strength Logging in Boreholes Penetrating Sedimentary Formations, 2004, pp. 174-183.*
"Sonic Investigations In and Around the Borehole", Spring 2006, J.L. Arroyo Franco, Gopa S.De, Lasse Renlie, and Stephen Williams, Oilfield Review.
Lang, S.W. et al., "Estimating Slowness Dispersion from Arrays of Sonic Waveforms", Geophysics, Apr. 1987, pp. 530-544, vol. 52, No. 4, Society of Exploration Geophysicists.
Bratton, T. et al., "Rock Strength Parameters from Annular Pressure while Drilling and Dipole Sonic Dispersion Analysis", SPWLA 45th Annual Logging Symposium, Jun. 6-9, 2004.

(Continued)

*Primary Examiner*—Michael P. Nghiem
*Assistant Examiner*—Toan M Le
(74) *Attorney, Agent, or Firm*—Dona C. Edwards; John H. Bouchard

(57) ABSTRACT

A method is disclosed for determining a rock strength of an Earth formation, including: receiving a signal representing a measured variation of velocities or slownesses as function of radius from and azimuth around a borehole; generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness; changing the rock strength in the rock strength model of the Mechanical Earth Model until the further prediction substantially matches the measured variation in velocity around and from the borehole; and generating a set of parameters, wherein the parameters are used to populate the MEM and are used in subsequent calculations.

48 Claims, 15 Drawing Sheets

OTHER PUBLICATIONS

Sayers, C.M. et al., "A Simple Technique for Finding Effective Elastic Constants of Cracked Solids for Arbitrary Crack Orientation Statistics", International Journal of Solids, 1991.

Sayers, C.M. et al., "Microcrack-induced Elastic Wave Anisotropy of Brittle Rocks", Journal of Geophysical Research, Mar. 10, 1995, pp. 4149-4156, vol. 100 No. B3, The American Geophysical Union.

Sayers, C.M., "Stress-dependent Elastic Anisotropy of Sandstones", Geophysical Prospering, 2002, pp. 85-95, European Association of Geoscientists & Engineers.

Sayers, C.M., "Effects of Borehole Stress Concentration on Elastic Wave Velocities in Sandstones", 76th Annual International SEG Meeting, 2006, pp. 329-333, New Orleans, US.

Mavko, Gary et al., "Predicting Stress-induced Velocity Anisotropy in Rocks", Geophysics, Jul.-Aug. 1995, pp. 1081-1087, vol. 60 No. 4, Society of Exploration Geophysicists.

Schoenberg, M., "Time-Dependent Anisotropy Induced by Pore Pressure Variation in Fractured Rock", Journal of Seismic Exploration, 2002, pp. 83-105, vol. 11, Geophysical Press.

Schoenberg, Michael et al., "Seismic Anisotropy of Fractured Rock", Geophysics, Jan.-Feb. 1995, pp. 204-211, vol. 60 No. 1, Society of Exploration Geophysicists.

Sayers, C.M., "Sensitivity of Elastic-wave Velocities to Stress Changes in Sandstones", The Leading Edge, Dec. 2005, pp. 1262-1266.

Pistre, V. et al., "A Modular Wireline Sonic Tool for Measurements of 3D (Azimuthal, Radial, and Axial) Formation Acoustic Properties," SPWLA 46th Annual Logging Symposium, Jun. 26-29, 2005, pp. 1-13, New Orleans, USA.

Plumb, R.A., "Influence of Composition and Texture on the Failure Properties of Clastic Rocks," Rock Mechanics in Petroleum, Eurock '94, SPE/ISRM International Conference, Aug. 29-31, 1994, pp. 13-20, A.A. Balkema/Rotterdam/Brookfield, Eurock, Delft, Netherlands.

* cited by examiner

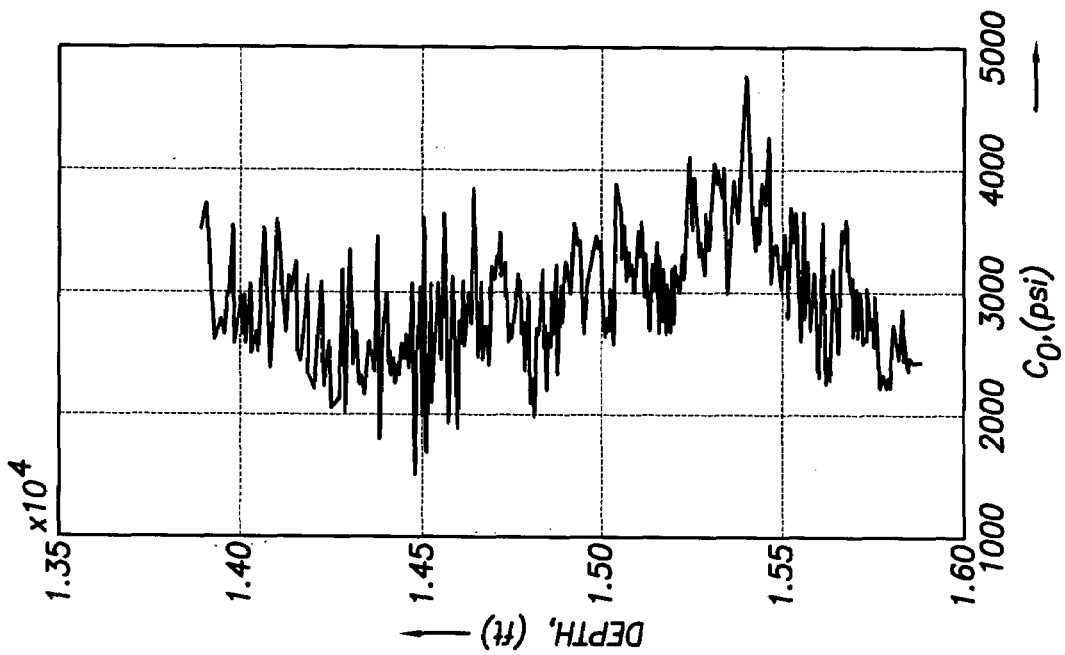
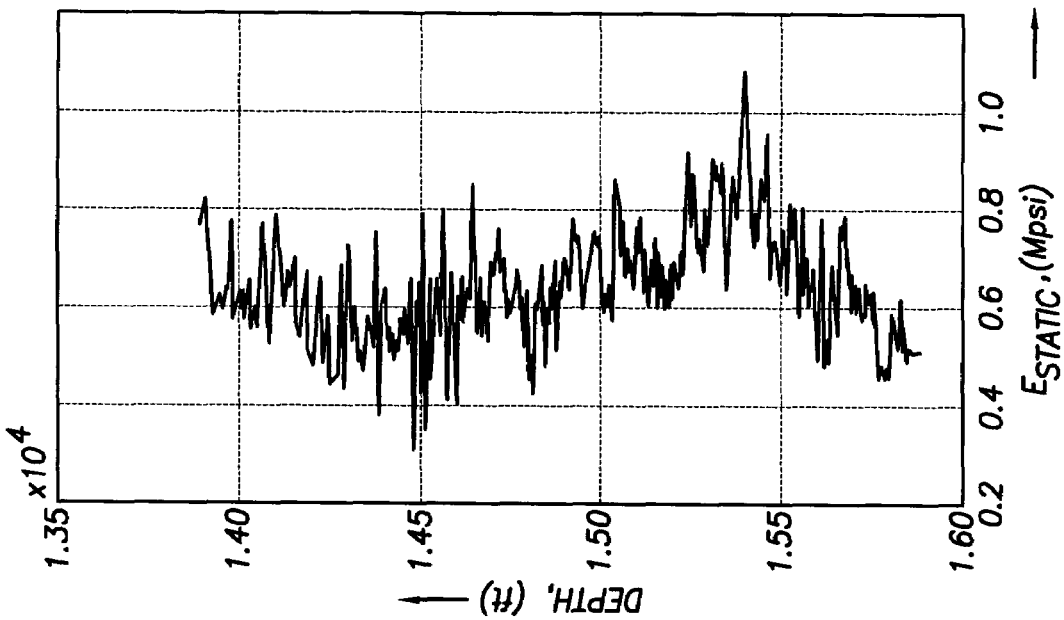

METHOD, SYSTEM AND APPARATUS FOR DETERMINING ROCK STRENGTH USING SONIC LOGGING

BACKGROUND

This subject matter relates to a method, and its associated system and program storage device and computer program, for determining rock strength using sonic logging, and, in particular, for estimating and determining the rock strength from radial profiling of acoustic wave velocities using a Sonic Scanner Tool. The rock strength is used in a rock strength model of a Mechanical Earth Model (MEM) for the purpose of performing subsequent geomechanical calculations and generating predictions.

Evaluating rock strength from log measurements is fundamental to the analysis and prediction of geomechanical problems encountered in the petroleum industry. Examples of geomechanical problems include wellbore stability and fracturing of the formation during drilling that may lead to financial loss due to losses, kicks, stuck pipe, extra casing strings and sidetracks, and problems due to reservoir stress changes occurring during production, such as reservoir compaction, surface subsidence, formation fracturing, casing deformation and failure, sanding, reactivation of faults, and bedding parallel slip. In this specification, a new method is disclosed to estimate rock strength properties using 'sonic radial profiling', an operation that can be performed using a Sonic Scanner tool.

The following U.S. Patents are incorporated by reference into the specification of this application: U.S. Pat. No. 6,904,365 to Bratton et al.

SUMMARY

One aspect of the present invention involves a method for determining a rock strength of an Earth formation, comprising: receiving a signal representing a measured variation of velocities or slownesses as a function of radius from and azimuth around a borehole; in response to the signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness; changing the rock strength in the rock strength model of the Mechanical Earth Model until the further prediction substantially matches the measured variation in velocity around and from the borehole; and, on the condition that the further prediction substantially matches the measured variation in velocity around and from the borehole, generating a set of parameters, wherein the parameters are used to populate the MEM and are used in subsequent calculations.

Another aspect of the present invention involves a computer program adapted to be executed by a processor, the computer program, when executed by the processor, conducting a process for determining a rock strength of an Earth formation, the process comprising: receiving a signal representing a measured variation of velocities or slownesses as a function of radius from and azimuth around a borehole; in response to the signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness; changing the rock strength in the rock strength model of the Mechanical Earth Model until the further prediction substantially matches the measured variation in velocity around and from the borehole; and, on the condition that the further prediction substantially matches the measured variation in velocity around and from the borehole, generating a set of parameters, wherein the parameters are used to populate the MEM and are used in subsequent calculations.

Another aspect of the present invention involves a program storage device readable by a machine, tangibly embodying a set of instructions executable by the machine, to perform method steps for determining a rock strength of an Earth formation, the method steps comprising: receiving a signal representing a measured variation of velocities or slownesses as a function of radius from and azimuth around a borehole; in response to the signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness; changing the rock strength in the rock strength model of the Mechanical Earth Model until the further prediction substantially matches the measured variation in velocity around and from the borehole; and, on the condition that the further prediction substantially matches the measured variation in velocity around and from the borehole, generating a set of parameters, wherein the parameters are used to populate the MEM and are used in subsequent calculations.

Another aspect of the present invention involves a system adapted for determining a rock strength of an Earth formation, comprising: apparatus adapted for receiving a signal representing a measured variation of velocities or slownesses as a function of radius from and azimuth around a borehole; in response to the signal, apparatus adapted for generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness; apparatus adapted for changing the rock strength in the rock strength model of the Mechanical Earth Model until the further prediction substantially matches the measured variation in velocity around and from the borehole; and, on the condition that the further prediction substantially matches the measured variation in velocity around and from the borehole, apparatus adapted for generating a set of parameters, wherein the parameters are used to populate the MEM and are used in subsequent calculations.

Further scope of applicability will become apparent from the detailed description presented hereinafter. It should be understood, however, that the detailed description and the specific examples set forth below are given by way of illustration only, since various changes and modifications within the spirit and scope of the 'Rock Strength Determination Software', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIGS. 10A and 10B illustrate Static Young's modulus and unconfined compressive strength predicted using a conventional approach for the compressional and shear wave velocities shown in FIGS. 9A and 9B;

DETAILED DESCRIPTION

Figure 8:
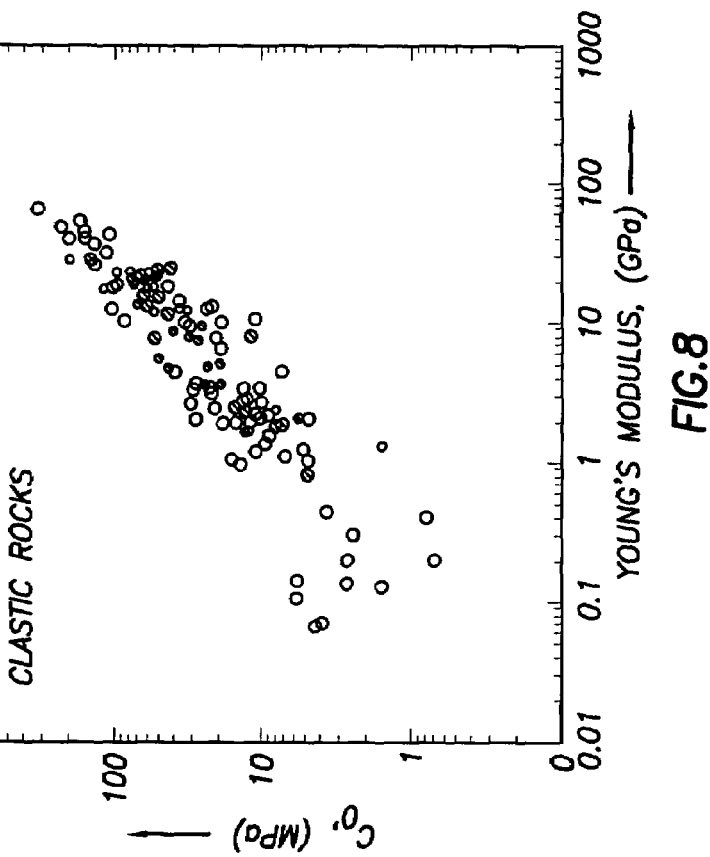
FIG. 8 illustrates the correlation between unconfined compressive strength and static Young's modulus for elastic rocks.

Evaluating 'rock strength' from log measurements is fundamental to the analysis and prediction of geomechanical problems encountered in the petroleum industry. Examples of geomechanical problems include wellbore stability and fracturing of the formation during drilling that may lead to financial loss due to losses, kicks, stuck pipe, extra casing strings and sidetracks, and problems due to reservoir stress changes occurring during production, such as reservoir compaction, surface subsidence, formation fracturing, casing deformation and failure, sanding, reactivation of faults, and bedding parallel slip. The presence of the wellbore causes changes in the stress field in the vicinity of the wellbore, and these changes in stress may lead to yield or failure of the rock. Yield or failure of the rock leads to changes in the velocity of compressional and shear waves in the vicinity of the borehole that vary with position relative to the borehole. These changes in wave velocity can be measured by an acoustical logging device and are governed by the in-situ stress and strength properties of the formation. Therefore, a determination of the variation in velocity as a function of azimuth and radial distance from the wellbore allows the 'rock strength' characteristics of the formation to be determined.

A conventional 'method for determining rock strength' of the formation proposes to determine the radius of a yielded zone from the point at which a shear-wave velocity begins to decrease as the borehole is approached. However, it is also known that the reduction in velocity may begin outside the yielded zone, especially when the non-linear variation in velocity with stress is included, and picking the radius at which the velocity begins to first decrease may give an inaccurate estimate of formation strength. U.S. Pat. No. 6,904,365 to Bratton et al, entitled "Methods and Systems for Determining Formation Properties and In-Situ Stresses", is incorporated by reference into the specification of this application.

In this specification, a 'new method for the determination of rock strength' of the formation is disclosed which overcomes the aforementioned problem. The main application of the 'new method' is in the prediction and management of rock deformation and failure. Geomechanical problems resulting from the change of stress in the rock induced by drilling and production make many hydrocarbon production projects challenging. Examples of geomechanical problems include wellbore stability and fracturing of the formation during drilling that may lead to financial loss due to fluid losses, kicks, stuck pipe, extra casing strings and sidetracks, and problems due to reservoir stress changes occurring during production such as reservoir compaction, surface subsidence, formation fracturing, casing deformation and failure, sanding, reactivation of faults and bedding parallel slip.

The 'new method for determining rock strength', disclosed in this specification, is designed to estimate the 'rock strength' properties of a formation using 'sonic radial profiling', which is an operation that is performed using a Sonic Scanner tool. In the 'new method for determination of rock strength' disclosed in this specification, in order to perform geomechanical predictions of wellbore stability, reservoir compaction, casing deformation and failure, bedding parallel slip, and fault reactivation, a 'Mechanical Earth Model (MEM)' is built in which data from many sources are combined. The MEM includes a plurality of workflow models, including a 'rock strength model' and a 'state of stress model' and a 'pore pressure model'. In order to predict rock failure and other geomechanical problems, it is necessary to properly characterize the rock strength and the state of stress and the pore pressure in the 'rock strength model', and to properly characterize the 'state of stress model' and the 'pore pressure model' in the Mechanical Earth Model (MEM), so that the Mechanical Earth Model can make accurate predictions. In this specification, a Sonic Scanner tool is used to determine the rock strength in the rock strength model.

The 'new method for determination of rock strength' of the formation, which is adapted for determining the rock strength in the rock strength model of a Mechanical Earth Model (MEM) in response to an 'output' from the Sonic Scanner tool (where the 'output' includes a measured variation of velocities or slownesses as a function of radius from and azimuth around the borehole), comprises the following basic steps: (1) the Mechanical Earth Model (MEM) makes 'predictions of the variation of stress, and hence velocity, as a function of distance from, and azimuth around, the borehole' (hereinafter the 'predictions'); and (2) the rock strength in the Mechanical Earth Model (MEM) is changed until the 'predictions' agree with or substantially match a 'measured variation in velocity around and from the borehole' that is generated by a 'Sonic Scanner tool'. When the 'predictions' substantially match the 'measured variation in velocity around and from the borehole', a set of parameters (for example, unconfined compressive strength, friction angle, and other geomechanical parameters), which were used to generate the 'predictions', are then used in subsequent calculations.

Referring to FIG. 8, a knowledge of rock strength is essential in order to be able to analyze and predict geomechanical problems encountered in the petroleum industry, such as wellbore stability, reservoir compaction, surface subsidence, formation fracturing, casing deformation and failure, sanding, reactivation of faults and bedding parallel slip. The conventional approach that is used to predict rock strength from log data includes establishing correlations between rock strength and a quantity that can be obtained from log data such as porosity, Young's modulus, etc. In FIG. 8, an example is illustrated which shows the correlation between unconfined compressive strength, Co, and static Young's modulus (Plumb, 1994). Predicting unconfined compressive strength using this correlation requires a further step of transforming from a dynamic Young's modulus, which can be determined from dipole sonic measurements of compressional and shear wave velocity, to static Young's modulus.

Figure 9B:
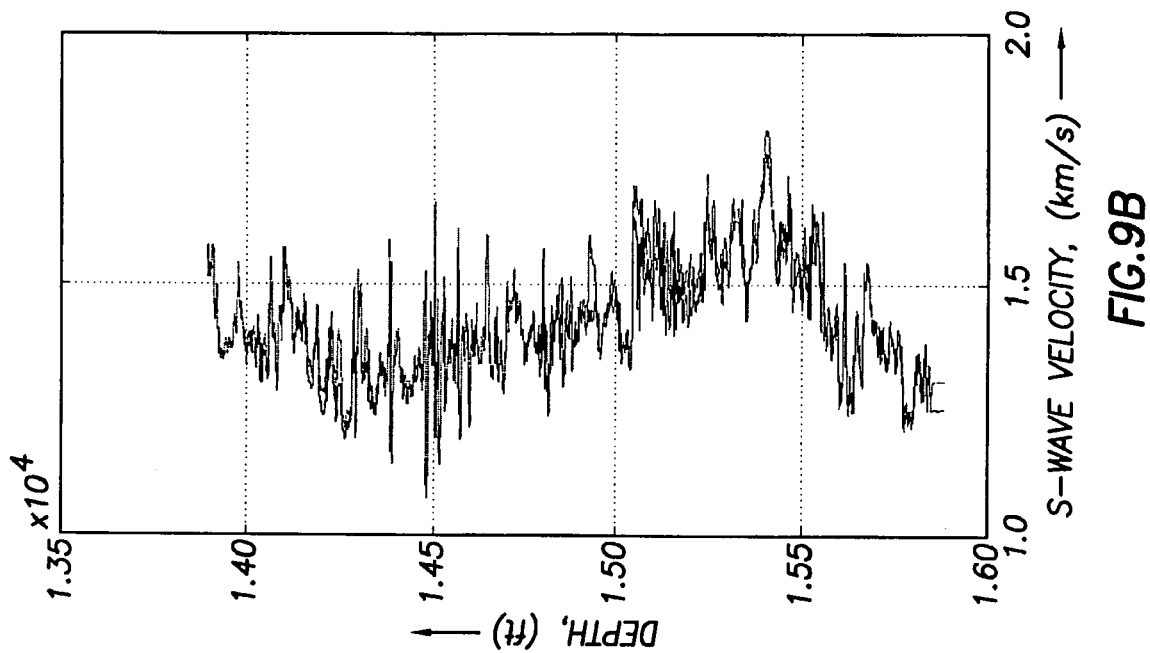
FIGS. 9A and 9B illustrate compressional and fast and slow shear wave velocities measured using a Sonic Scanner Tool outside a perturbed zone around a borehole.
Figure 9A:
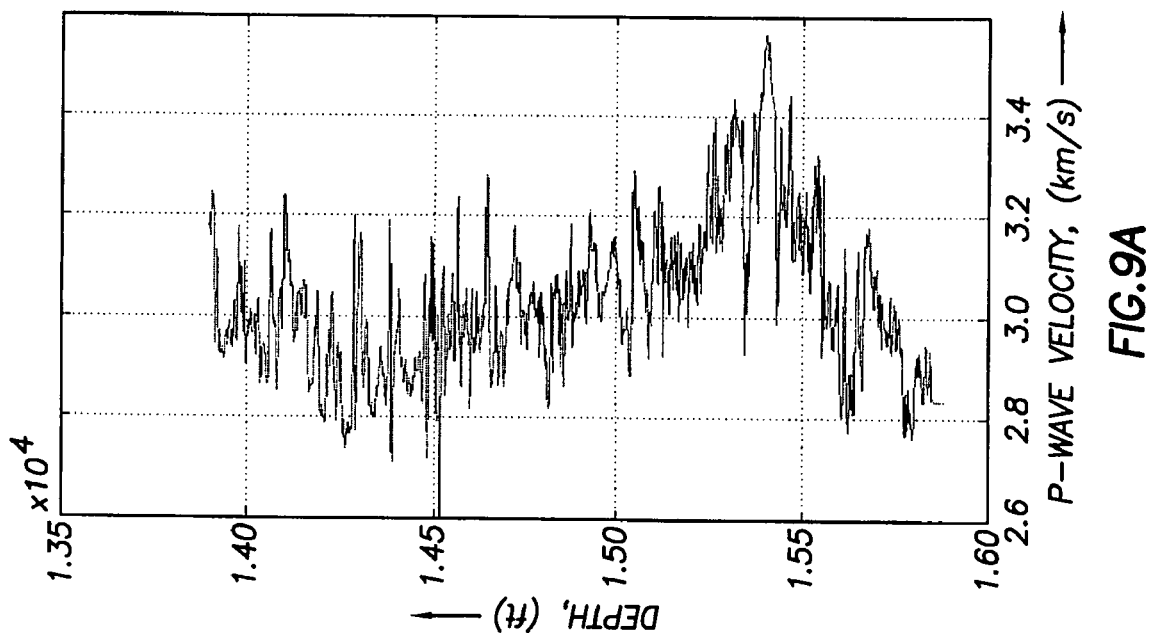

Referring to FIGS. 9A-9B and 10A-10B, an example of a conventional approach is shown in FIGS. 9A-9B and 10A-10B. FIGS. 9A-9B show the compressional and fast and slow shear wave velocities measured using the Sonic Scanner outside the perturbed zone around a borehole for a Gulf of Mexico example, while FIGS. 10A-10B show the static Young's modulus and unconfined compressive strength predicted using the conventional approach.

While the unconfined compressive strength shown in FIGS. 10A-10B can be used to analyze and predict geomechanical problems encountered in the petroleum industry, the accuracy of the value of unconfined compressive strength obtained depends on the accuracy of the correlation used. Since these correlations are established using well data in a different location to the well in question, a direct estimation of rock strength without the need to use a correlation is to be preferred.

In this specification, a new method is disclosed for estimating rock strength from radial profiling of acoustic wave velocities using a Sonic Scanner tool. The presence of the wellbore causes changes in the stress field in the vicinity of the wellbore, and these changes in stress may lead to yield or failure of the rock. Yield or failure of the rock leads to changes in the velocity of compressional and shear waves in the vicinity of the borehole that vary with position relative to the borehole. These changes in wave velocity can be measured by an acoustical logging device and are governed by the strength characteristics of the formation. Determination of the variation in velocity as a function of azimuth and radial distance from the wellbore allows the strength characteristics of the formation to be determined.

Figure 1:
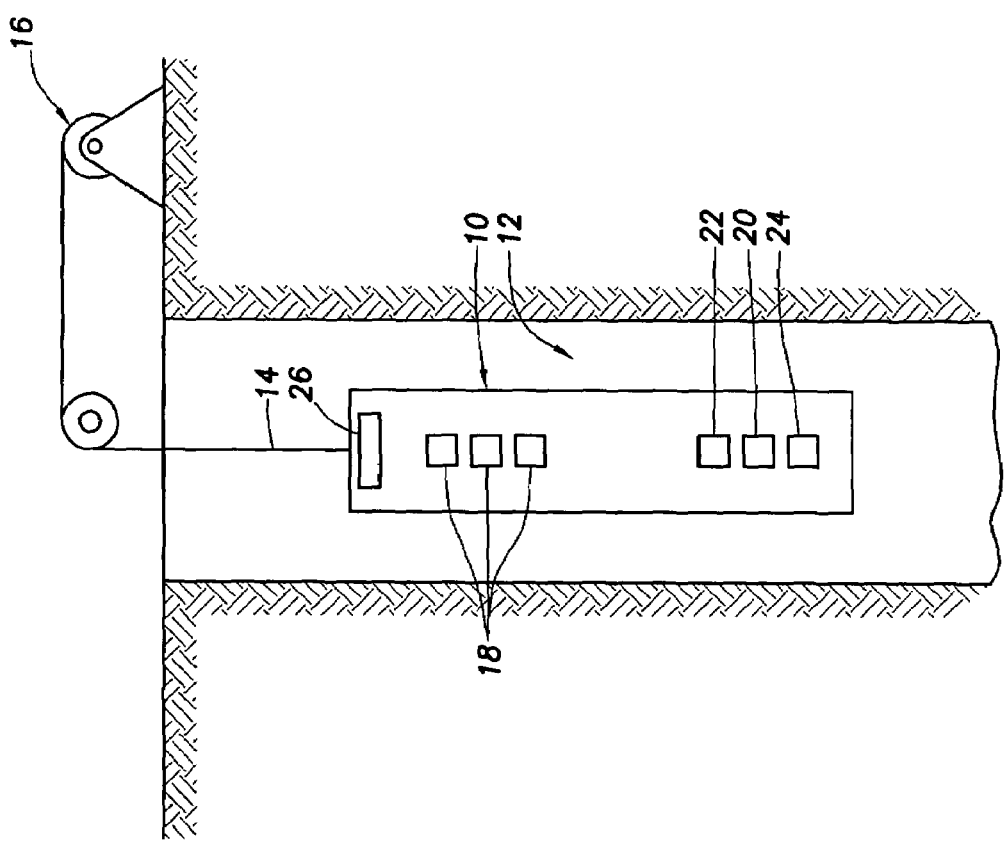
FIG. 1 illustrates a Sonic Scanner Tool.

Referring to FIG. 1, one example of a Sonic Scanner tool is illustrated. Recall that the aforementioned 'measured variation in velocity around and from the borehole' is generated by a 'Sonic Scanner tool'.

In FIG. 1, formation property measurements that may be used with embodiments of the invention include any measurement that can respond to stress changes in the vicinity of the wellbore. Examples of these measurements include acoustic measurements, resistivity measurements, and spontaneous potential measurement. Although embodiments of the invention may use any formation measurement that responds to stress changes in around the wellbore, for clarity, the following description uses acoustic measurements (as an example) that are generated by a 'Sonic Scanner Tool'. The 'Sonic Scanner Tool' is owned and operated by Schlumberger Technology Corporation of Houston, Tex. Acoustic (or sonic) logging, which employs sound waves to obtain information about subsurface formations, entails lowering a sonic logging instrument into a wellbore drilled through the formations. Examples of sonic logging instruments may be found in U.S. Pat. Nos. 5,838,633; 5,852,587; 5,309,404; 5,387,767; and 4,594,691. Each of these instruments typically includes an acoustic transmitter and a plurality of receivers spaced apart from the transmitter along the longitudinal axis of the instrument. In accordance with embodiments of the invention, any of the prior art acoustic logging instruments may be used with other modules having the capability to measure borehole pressures. Alternatively, an acoustic logging instrument may be modified to include a pressure sensor. An acoustic tool, such as the 'Sonic Scanner tool' provided by Schlumberger Technology Corporation, includes a pressure sensor, as illustrated in FIG. 1. In FIG. 1, the acoustic tool 10 is suspended in a wellbore 12 by means of a wireline 14 and a winch 16, as is well known in the art. The acoustic (Sonic Scanner) tool 10 of FIG. 1 may include a plurality of acoustic detectors (receivers) 18, and one or more acoustic energy sources (transmitters), which can be a monopole source 20 or a dipole source 22. The monopole source 20 provides a Stoneley wave as well as a compressional headwave in all formations. The monopole source 20 may also provide a shear headwave in fast formations. The dipole source 22, on the other hand, provides a flexural wave. In addition, the shear wave arrival time in the far field (the region in which the perturbation in the stress field by the wellbore is small) can be found as the low frequency limit of the flexural wave dispersion arrivals. The acoustic detectors 18 typically include both monopole and dipole detectors. The acoustic tool 10 also includes a pressure sensor 24 that is used to measure the wellbore pressure. The acoustic tool 10 may further include a downhole processing unit 26, which typically comprises a microprocessor and associated circuitry, coupled to the detectors or receivers 18. The downhole processing unit 26 can determine the shear and compressional wave velocities and can process the flexural or Stoneley wave information using any processing method known in the art, such as the 'Dipole Radial Profiling' disclosed in this specification. Note that the important processing approach is the extraction of sonic dispersion curves and the inversion of these for slowness vs radius from the borehole, as described by 'B. K. Sinha' in the 'Sinha' patents in the 'references' section of this specification (which are incorporated herein by reference). The low frequency gives information of the velocity in the far field (the region in which the perturbation in the stress field by the wellbore is small) while higher frequencies have a shallow depth of investigation, and so can be used to determine the stress perturbation be the borehole. In summary, the key method described herein is called 'dipole radial profiling'. Refer to S. W. Lang et al., 'Estimating Slowness Dispersion from Arrays of Sonic Waveforms', 52 Geophysics, 530-544 (1989), the disclosure of which is incorporated by reference herein. Alternatively, the log data may be stored in the tool (e.g., in the processing unit 26) for later processing.

In an acoustic logging operation, the monopole transmitter 20 or dipole transmitter 22 is periodically actuated to emit pulses of acoustic energy into the wellbore, which travels through drilling fluid in the wellbore and then along the wall of the wellbore. After traveling along the wellbore wall, some of the acoustic energy travels to the receivers 18, where acoustic waves are detected. Various attributes of the detected acoustic energy are dependent on the properties of the formations, such as compressional velocity and shear velocity. The formation properties that can affect acoustic energy transmission include formation strength (or 'rock strength') and in-situ stresses of the formation. Therefore, acoustic measurements may be used to infer magnitudes of the in-situ stresses imposed upon subsurface formations.

The 'acquired acoustic measurements' need to be 'processed' to provide the 'desired formation properties'. Processing known in the art for determining compressional and/or shear velocity includes correlation of the waveforms of the acoustic energy detected at each of the receivers. The correlation is performed using various values of slowness (the inverse of velocity) until a degree of coherence between all the waveforms is determined. A well-known method for such processing is called 'Prony's method'.

Figure 2:
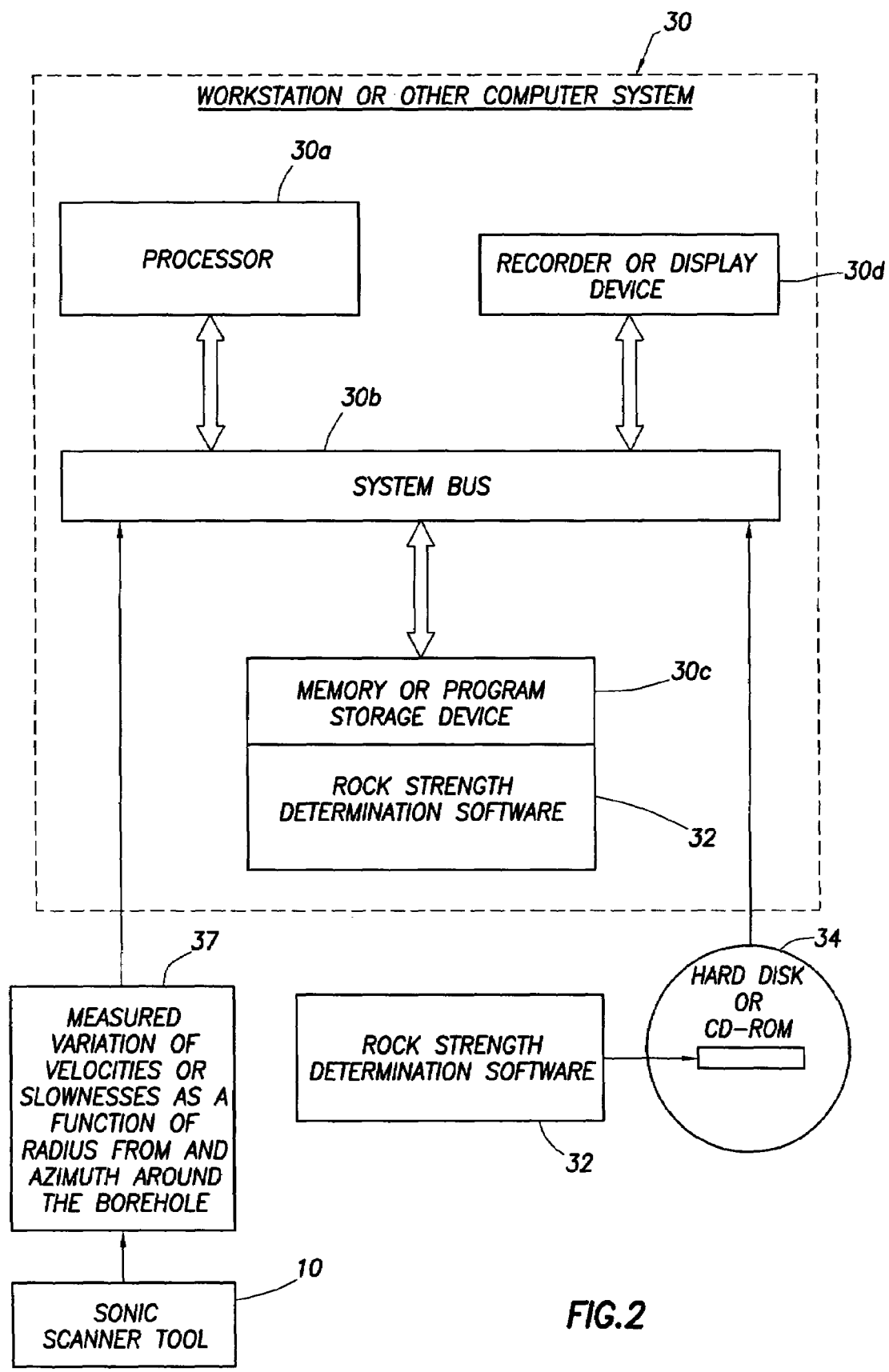
FIG. 2 illustrates a computer system adapted for storing a Rock Strength Determination Software.

Referring to FIG. 2, a workstation or other computer system, such as the 'downhole processing unit' 26 in FIG. 1, is illustrated. The computer system of FIG. 2 is adapted for 'processing' the aforementioned 'acquired acoustic measurements' generated by the Sonic Scanner tool 10 of FIG. 1 in order to generate and provide the 'desired formation properties', such as 'rock strength'. The 'processing' is performed by a 'Rock Strength Determination Software' that is stored in a memory of the computer system of FIG. 2 in conjunction with the computer system's processor in response to an 'output' 37 from the Sonic Scanner tool 10 of FIG. 1, where the 'output' 37 from the Sonic Scanner tool 10 includes a 'measured variation of velocities or slownesses as a function of radius from and azimuth around the borehole' 37.

In FIG. 2, a workstation, personal computer, or other computer system 30 is illustrated adapted for storing a 'Rock Strength Determination software'. The computer system 30 of FIG. 2 includes a Processor 30a operatively connected to a system bus 30b, a memory or other program storage device 30c operatively connected to the system bus 30b, and a recorder or display device 30d operatively connected to the system bus 30b. The memory or other program storage device 30c stores the 'Rock Strength Determination software' 32 that practices the 'new method for determination of rock strength' of the formation that is disclosed in this specification. The 'Rock Strength Determination software' 32, which is stored in the memory 30c of FIG. 2, can be initially stored on a Hard Disk or CD-Rom 34, where the Hard Disk or CD-Rom 34 is also a 'program storage device'. The CD-Rom 34 can be inserted into the computer system 30, and the 'Rock Strength Determination software' 32 can be loaded from the CD-Rom 34 and into the memory/program storage device 30c of the computer system 30 of FIG. 2. In FIG. 2, the computer system 30 receives 'input data' 37 from the 'Sonic Scanner tool' 10, the 'input data' 37 including: a 'measured variation of velocities or slownesses as a function of radius from and azimuth around the borehole' 37. In operation, the Processor 30a will execute the 'Rock Strength Determination software' 32 that is stored in memory 30c of FIG. 2 in response to the 'input data' 37 from the Sonic Scanner tool 10 (where the 'input data' from the Sonic Scanner tool 10 includes the 'measured variation of velocities or slownesses as a function of radius from and azimuth around the borehole' 37); and, responsive thereto, the Processor 30a will generate an 'output display' that can be recorded or displayed on the Recorder or Display device 30d of FIG. 2. The 'output display', which is recorded or displayed on the Recorder or Display device 30d of FIG. 2, can generate and display one or more 'parameters' 78 (as noted in FIG. 6) which are used to populate a Mechanical Earth Model (MEM) that is adapted for generating predictions, and to perform subsequent geomechanical calculations, where the 'parameters' include 'unconfined compressive strength, friction angle, and other geomechanical parameters. The computer system 30 of FIG. 2 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 30c (including the above referenced Hard Disk or CD-Rom 34) is a 'computer readable medium' or a 'program storage device' which is readable by a machine, such as the processor 30a. The processor 30a may be, for example, a microprocessor, microcontroller, or a mainframe or workstation processor. The memory or program storage device 30c, which stores the 'Rock Strength Determination software' 32, may be, for example, a hard disk, ROM, CD-ROM, DRAM, or other RAM, flash memory, magnetic storage, optical storage, registers, or other volatile and/or non-volatile memory.

Figure 3:
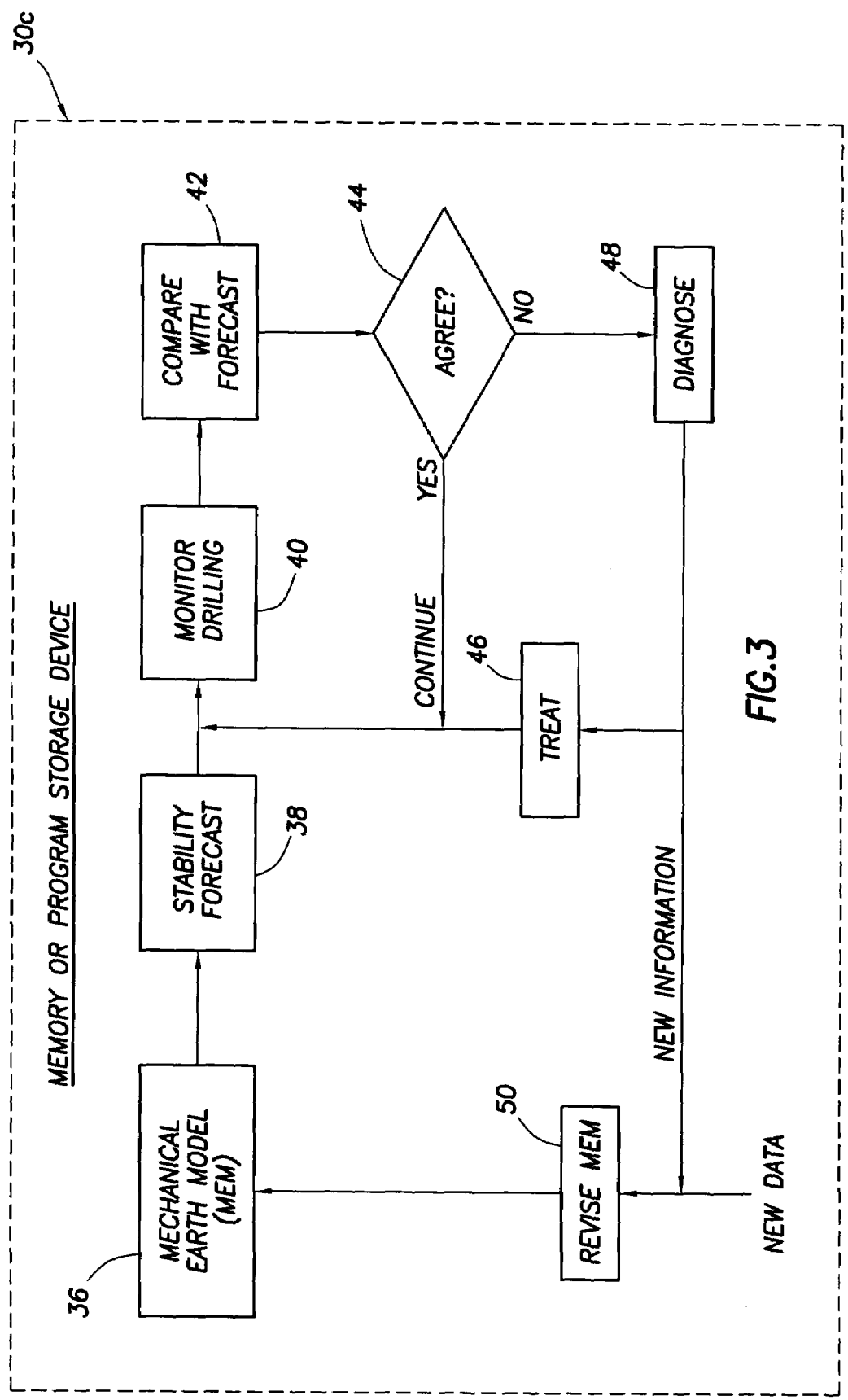
FIG. 3 illustrates a Mechanical Earth Model (MEM) including its purpose for generating stability forecasting and a method for revising the MEM.

Referring to FIG. 3, the memory or program storage device 30c of FIG. 2 stores a 'Mechanical Earth Model (MEM)'. In FIG. 3, the 'Mechanical Earth Model (MEM)' is illustrated including its purpose for generating stability forecasting and a method for 'real time updating' and revising the Mechanical Earth Model (MEM).

In FIG. 3, a Mechanical Earth Model (MEM) 36 is illustrated that is adapted for generating 'stability forecasts' or 'predictions'. The MEM 36 comprises a 3D description of pore pressure, stress, and mechanical properties linked to a 3D framework model comprising surfaces, such as formation tops and faults. The MEM 36 is adapted for generating stability forecasts or 'predictions' (step 38). Wellbore drilling begins, the drilling is monitored (step 40), and a set of 'observations' are generated during the monitoring of the drilling. The set of 'observations' (which are generated from the monitoring of the drilling during step 40) are compared with the stability forecasts or 'predictions' (step 42). If the stability forecasts or 'predictions' agree with the set of 'observations' (step 44), the 'predictions' generated by the MEM 36 are accurate. As a result, steps 40 and 42 are repeated. If the stability forecasts or 'predictions' do not agree with the set of 'observations' (step 44), the 'predictions' generated by the MEM 36 are not accurate. As a result, the 'inaccurate predictions' problem associated with the MEM 36 is diagnosed (step 48), the wellbore is 'treated' (step 46), the MEM 36 is revised upon completion of the diagnosis of the problem (step 50), and steps 38, 40, 42, and 44 are repeated until the stability forecasts or 'predictions' agree with the set of 'observations' (step 44) and, as a result, the 'predictions' generated by the MEM 36 are now considered to be accurate. The process illustrated in FIG. 3 will be discussed in greater detail in later sections of this specification with reference to FIG. 5 of the drawings.

Figure 4:
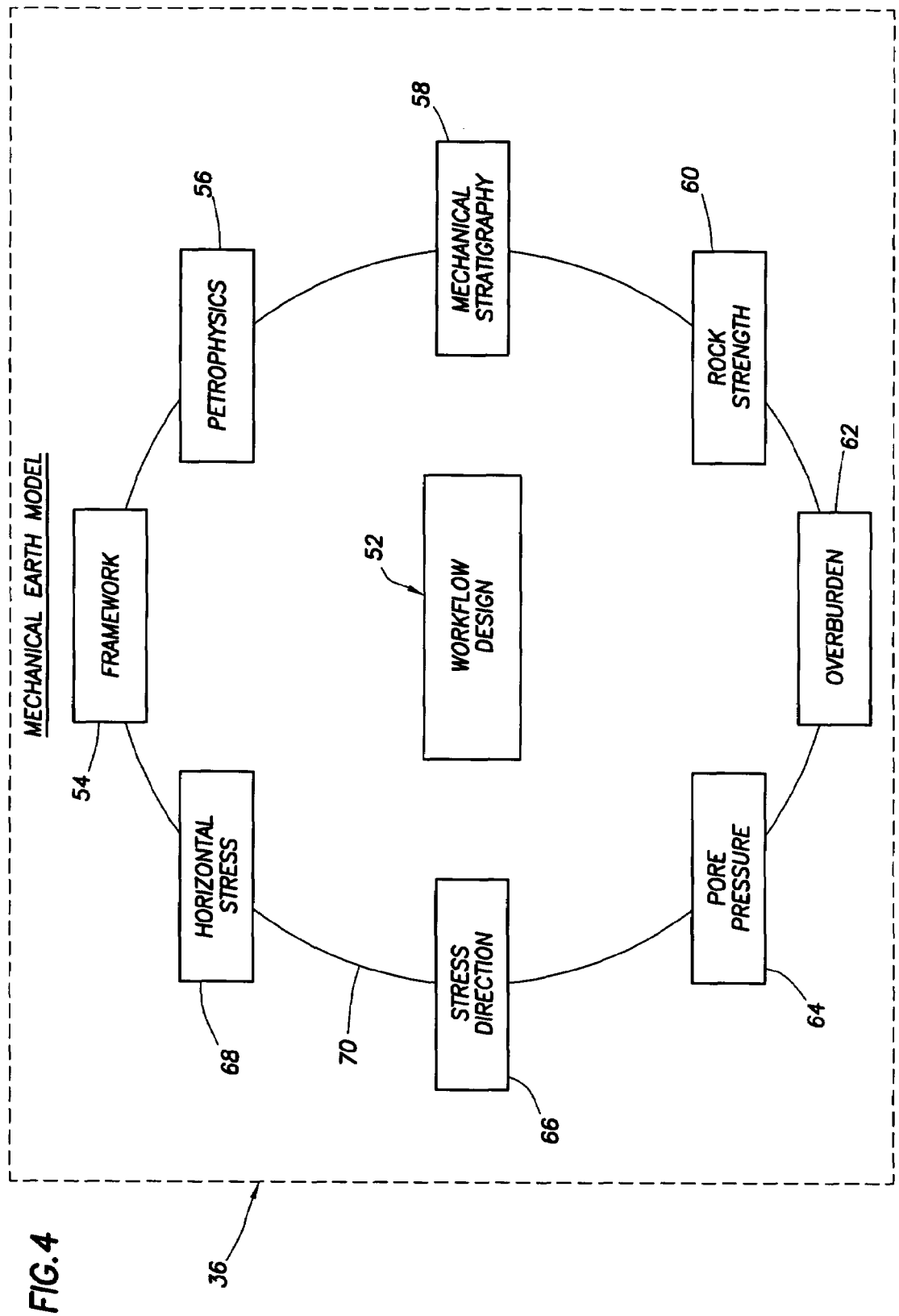
FIG. 4 illustrates how the Mechanical Earth Model (MEM) of FIG. 3 includes a workflow design including a plurality of individual workflow models, one of the individual workflow models being a Rock Strength Model.

Referring to FIG. 4, a more detailed construction of the Mechanical Earth Model (MEM) 36 of FIG. 3 is illustrated. In FIG. 4, the MEM 36 of FIG. 3 has a 'workflow design' 52 that includes a plurality of 'individual workflow models' 54, 56, 58, 60, 62, 64, 66, and 68, and one of the 'individual workflow models' is a 'Rock Strength Model' 60.

In FIG. 4, an example of a 'workflow design' 52 of the MEM 36 is illustrated. The 'workflow design' 52 includes a plurality of 'individual workflow models' 54, 56, 58, 60, 62, 64, 66, and 68 that are used to define an 'Initial Mechanical Earth Model (MEM)' 36. The 'individual workflow models' 54, 56, 58, 60, 62, 64, 66, and 68 of the 'workflow design' 52 of the MEM 36 of FIGS. 3 and 4 are adapted for modeling drilling and completion operations in hydrocarbon reservoirs, the 'individual workflow models' including: a Framework model 54, a Petrophysics model 56, a Mechanical Stratigraphy model 58, a Rock Strength model 60, an Overburden model 62, a Pore Pressure model 64, a Stress Direction model 66, and a Stress Magnitude or Horizontal Stress model 68, respectively (hereinafter called 'individual workflow models' 54, 56, 58, 60, 62, 64, 66, and 68 or just 'individual workflow models'). In the example shown in FIG. 4, an 'Initial Mechanical Earth Model' (that is adapted for modeling drilling and completions operations in hydrocarbon reservoirs) is created that includes several 'individual workflow models' 54, 56, 58, 60, 62, 64, 66, and 68, and one such workflow model is a 'Rock Strength Model' 60. Each of the 'individual workflow models' 54-68 use specific data for modeling purposes; for example, the 'Rock Strength Model' 60 will model the rock strength properties of an Earth formation.

The data that is used by the 'individual workflow models' for modeling purposes, which includes the 'Rock Strength Model' 60, may be based on current measurements, predetermined information and/or other sources. Additional measurements may be taken to collect the desired data for the workflow models. The data may be compiled, organized and analyzed for processing through the 'individual workflow models' 54, 56, 58, 60, 62, 64, 66, and 68 of FIG. 4. Typically, an 'individual workflow model' is selected according to the desired formation parameters required by the job design. For example, data relating to lithology and mechanical stratigraphy (sands behave differently mechanically than shales, for example) may be input into a 'mechanical stratigraphy' model 58 and applied to the MEM 36 of FIG. 4 to determine the potential impact on the completions operations. The types of data that may be used spans a broad area and may include, for example seismic data, drilling data, logging data, geologic and other data. The data may be managed to improve the performance of the job design and/or to facilitate processing. Preferably, the data is quickly and easily accessible. In some cases, the data may be generated from multi-well and/or multi-run data sets. Some such sets may have images that require data process and editing to present the data in a usable form. Preferably, original data and processing is kept online or near-line for verification and/or additional interpretation that may be required. In addition, data from a geomechanical audit may be synthesized to a key data set for quicker database access and downstream processing. Because these projects often involve large data sets, time and performance can become an issue. In some cases, it may be necessary to move key edited data to a second project for upstream interpretations. Data is preferably configured for quick and easy movement between projects, for example by using a data manager project data export function. The data may be supported in multiple locations. The data may also be configured into smaller data sets to allow for quicker movement across low bandwidth networks. Certain data sets may be identified as key data and positioned for optimum use. The data may be manipulated as necessary to generate the best outcome. If desired, the data may be analyzed and reconfigured for optimum processing. Based on known constraints or other factors, the data may be prioritized, filtered, arranged or otherwise manipulated to achieve the desired job design. The data is preferably selected according to the problem to be solved. The data may also be audited and analyzed to provide the best data and generate the best outcome. There is potentially a large amount of data to digest. It may be useful to process certain data, such as seismic data, in advance. A significant amount of data can be analyzed in data processing software. Petrophysical logs may be analyzed for a complete formation evaluation. While borehole images may be analyzed for formation dip sand naturally occurring fractures, another pass through the data may be performed to specifically look for drilling induced conditions, such as fracturing and breakouts. Other data analysis, such as the analysis of caliper data and sonic waveforms, may be performed, for example, where the field processing is suspect. As the number of geomechanical observations increase, constraints may be placed on the workflow models. Each 'individual workflow model' (i.e., one of workflow models 54, 56, 58, 60, 62, 64, 66, and 68 of FIG. 4) may be a single or multi-dimensional model. A one-dimensional model provides a simple and quick structure for the MEM of FIG. 4. Multi-dimensional cases provide more comprehensive information, but are more complex. In some cases, a simple one-dimensional model is sufficient. In other cases, multi-dimensional models may be needed to fully appreciate the wellsite conditions.

The various selected 'individual workflow models' 54, 56, 58, 60, 62, 64, 66, and 68 are capable of predicting conditions that may affect the wellbore operation. In the example shown in FIG. 4, the workflow models 54-68 are selected in order to provide information about wellbore conditions that may affect the drilling and/or completions operations. Each of the example 'individual workflow models' 54, 56, 58, 60, 62, 64, 66, and 68 of FIG. 4 is described further below.

Framework data is fed into a framework model 54 to predict the structure of the reservoir, such as faults, pinchouts, unconformities, the surfaces of the major formation tops and other parameters. For a one-dimensional model, the framework model may simply be a description of the stratigraphic column, or formation tops, in true vertical depth. A simple one-dimensional model may be insufficient to provide the geomechanics engineer enough insight or understanding to build a fully three-dimensional model. A fully three-dimensional model may be important for three-dimensional stress modeling. The framework model 54 may be constructed from seismic and logging data. The seismic data may include appropriate seismic sections and velocities calibrated from check-shot data. Typical petrophysical logs may be used to help identify the major formation tops. Dipmeter logs may be used to quantify the formation dip and the location of faults and unconformities.

Petrophysical data is fed into a petrophysical model 56 to predict parameters, such as the porosity, lithology/mineralogy, saturation, reservoir pressure and the permeability of the non-fractured reservoir. The petrophysical model 56 may be constructed from formation logs and recovered core. The porosity mineralogy/lithology, saturation, and permeability of the different layers may be quantified. The petrophysical properties may also be validated with standard petrophysical tests conducted on recovered core.

Mechanical stratigraphy data is fed into a mechanical stratigraphy model 58 to predict the properties of the formation between the formation tops. Elastic properties of the intact rock and characterize the open natural fractures (ONF) system are preferably quantified. This model 58 may be used to differentiate between layers of different mechanical properties. In addition to layers of different lithology, there may be boundaries due to contrasting stiffness, like Young's modulus, and boundaries due to contrasting mechanical support. In some facies, the matrix may support the overburden. In others, the particles of clay support the overburden model 62. The mechanical stratigraphy model 58 may be constructed from the petrophysical model 56 incorporating the acoustical and wellbore imaging logs. An analysis of wellbore images and sonic scanner data can be used to assist in the processing.

Rock strength data is fed into a rock strength model 60 to predict the coefficients that characterize the yield and failure of the formation. While the specific coefficients are model dependent, a minimum characterization includes the Mohr-Coulomb model described by a friction angle and the unconfined compressive strength and the tensile strength of the formation. Other formation yield and failure models may also be used. The rock strength model 60 may be constructed from the petrophysical 56 and mechanical stratigraphy model 58. When mechanical tests on recovered core are available, the rock strength model 60 may be calibrated to the laboratory measurements. When mechanical tests are not available, a correlation may be used. Correlations are usually not universal and an uncertainty analysis may be necessary when correlations are used.

Overburden data is fed into an overburden model 62 to document the vertical stress in the earth. The vertical stress is the integration of the bulk density of the many layers along a vertical line from the point of interest to the surface of the earth. For deviated or horizontal wells it may be necessary to use a two or three-dimensional workflow model. The overburden model 62 may be constructed by integrating a bulk density log. Missing data in the shallow horizons are typically encountered. To eliminate uncertainties from the missing data, the bulk density in the layers with missing data may be estimated. Mud logs may be used to help estimate the missing data.

Pore pressure data is fed into a pore pressure model 64 to document the fluid pressure in the formation. All formations that have porosity typically have a fluid pressure within the pores of various types of formation, such as sands, carbonates and shales. The pore pressure model 64 may be constructed using the framework 54, petrophysical 56, mechanical stratigraphy 58 and overburden 62 models. The seismic processing needed for pore pressure prediction is typically different from that needed for the workflow model. It may also be useful to note the processing applied (post-stack time, pre-stack time, post-stack depth, pre-stack depth) and method used to obtain the velocities, as well as who acquired and who processed the data.

Stress direction data is fed into a stress directional model 66 to document the direction of the three mutually independent principal stresses. Formations with significant structure require complex stress modeling, such as that achieved with finite element or finite difference analysis. Here the boundary conditions of the reservoir may play a critical role in the estimation of the direction of the in-situ stresses acting in the earth.

Stress data from a calibration database is fed into a horizontal stress model 68 to document the magnitude of the two quasi-horizontal stresses. More correctly, we need the 3 principal stresses. In general the second-rank stress tensor with 6 independent components may be diagonalized to give the three principal stress components and their directions. Formations with significant structure may require more complex stress modeling. The minimum and maximum horizontal stress model 68 is constructed using all the previous models 54, 56, 58, 60, 62, 64, and 66. Lost circulation events, leak-off tests and pre-stimulation calibration tests may provide calibrations points.

In FIG. 4, the workflow models 54, 56, 58, 60, 62, 64, 66, and 68 of FIG. 4 are positioned in a specific, clockwise order about circle 70. Each workflow model is preferably assembled in sequential order according to its clockwise position about circle 70. In the example shown, the models were selected to optimize the workflow design, the MEM and the related completion design. While specific workflow models 54, 56, 58, 60, 62, 64, 66, and 68 of FIG. 4 are depicted in a specific order, it will be appreciated that other workflow models may also be positioned in any desired order depending on: (1) the desired workflow design, (2) the Earth Model (EM), and (3) the designed operation. The workflow design may involve the use of one or more workflow models in sequential order and/or simultaneously. The workflow design may be configured for other wellsite operations and/or other Earth Models (EMs).

Figure 5:
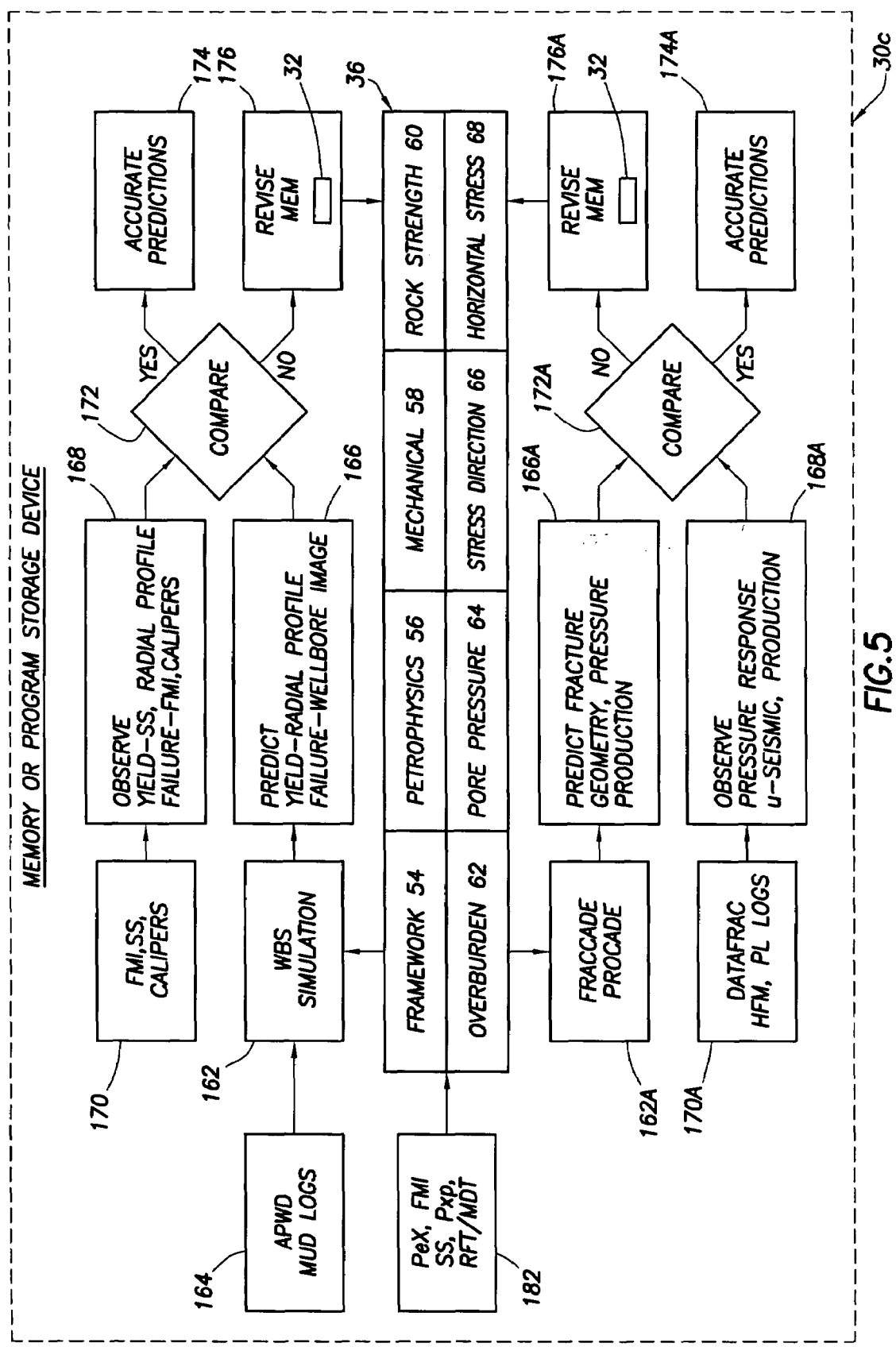
FIG. 5 illustrates, in greater detail, the Mechanical Earth Model (MEM) including its purpose for generating stability forecasting and a method for revising the MEM of FIG. 3 including a method for revising the Mechanical Earth Model (including the Rock Strength Model) until a set of observations compare accurately with and substantially match a set of predictions, at which point, a set of parameters (such as unconfined compressive strength) are used to populate the MEM (including the Rock Strength Model) for the purpose of performing subsequent geomechanical calculations.

Referring to FIG. 5, recalling the method involving the MEM 36 described above with reference to FIG. 3, in FIG. 5, the Mechanical Earth Model (MEM) 36 of FIG. 4 (including the Rock Strength Model 60) is revised until a set of 'observations' compare accurately with and substantially match a set of 'predictions', at which point, a set of 'parameters' (such as unconfined compressive strength) are used to populate the MEM 36 (including the Rock Strength Model 60) for the purpose of performing subsequent geomechanical calculations.

In FIG. 5, in a first application, a Mechanical Earth Model (MEM) 36 is created based on the 'workflow models' 54, 56, 58, 60, 62, 64, 66, and 68 illustrated in FIG. 4, namely, the framework model 54, the petrophysics model 56, the mechanical stratigraphy model 58, the rock strength model 60, the overburden model 62, the pore pressure model 64, the stress direction model 66, and the horizontal stress model 68. Note, in particular, the Rock Strength model 60 associated with the Mechanical Earth Model (MEM) 36 illustrated in FIG. 5. In FIG. 5, data 182, such as imaging, logs, sonic scanners and other pertinent data, may be input into the 'workflow models' of the MEM 36 in FIG. 5 in order to generate the Mechanical Earth Model (MEM) 36. Simulations 162 are performed based on the MEM 36 to generate predictions 166, such as yield and failure. The simulations 162 may be based on data 164, such as APWD mud logs. The simulations 162 generate predictions 166, such as failure and yield. Observations 168, such as yield and failure, may also be made using measurements from instruments 170, such as imagers, sonic scanners and calipers. The observations 168 and predictions 166 may then be compared in the compare triangle 172. Where the comparisons indicate agreement (see 'Yes' from triangle 172), the predictions are considered accurate 174. If not, the MEM 36 may be revised 176 [see 'Revise Mechanical Earth Model (MEM)' 176 in FIG. 5] until the predictions 166 agree with and substantially match the observations 168 (in the compare triangle 172) and, as a result, the predictions are determined to be accurate 174. Note that the 'Revise MEM' step 176 in FIG. 5 includes the 'Rock Strength Determination software' 32 of FIG. 2, a subject which will be discussed later in this specification.

In FIG. 5, in a second application, simulations 162A are performed based on the MEM 36 to generate predictions 166A, such as yield and failure. The simulations involve various models capable of generating the predictions 166A, such as geometry, pressure and production. Observations 168A, such as pressure response, seismic and production, may also made using measurements from instruments 170A, such as logs. The observations 168A and predictions 166A may then be compared in the compare triangle 172A. Where the comparisons indicate agreement (see 'Yes' from compare triangle 172A), the predictions 166A substantially match the observations 168A. As a result, the predictions 166A are considered accurate 174A. If not, the MEM 36 may be revised 176A [see 'Revise Mechanical Earth Model (MEM)' 176A] until the predictions 166A agree with and substantially match the observations 168A (in the compare triangle 172A) and, as a result, the predictions 166A are determined to be accurate 174A. Note that the 'Revise MEM' step 176A in FIG. 5 includes the 'Rock Strength Determination software' 32 of FIG. 2, a subject which will be discussed later in this specification.

The Rock Strength Determination software 32 of FIG. 2 is embodied within the 'Revise Mechanical Earth Model (MEM)' step 176, 176A of FIG. 5, wherein the Rock Strength Determination software 32 is adapted for revising the Rock Strength model 60 of the MEM 36 of FIGS. 4 and 5 until the predictions 166, 166A agree with and substantially match the observations 168, 168A (in the compare triangle 172, 172A) of FIG. 5, at which point, the predictions 166, 166A are determined to be accurate 174, 174A, and, as a result, a set of 'parameters', such as unconfined compressive strength and friction angle and other geomechanical parameters, are used to populate the MEM 36 for subsequent geomechanical calculations.

Figure 6:
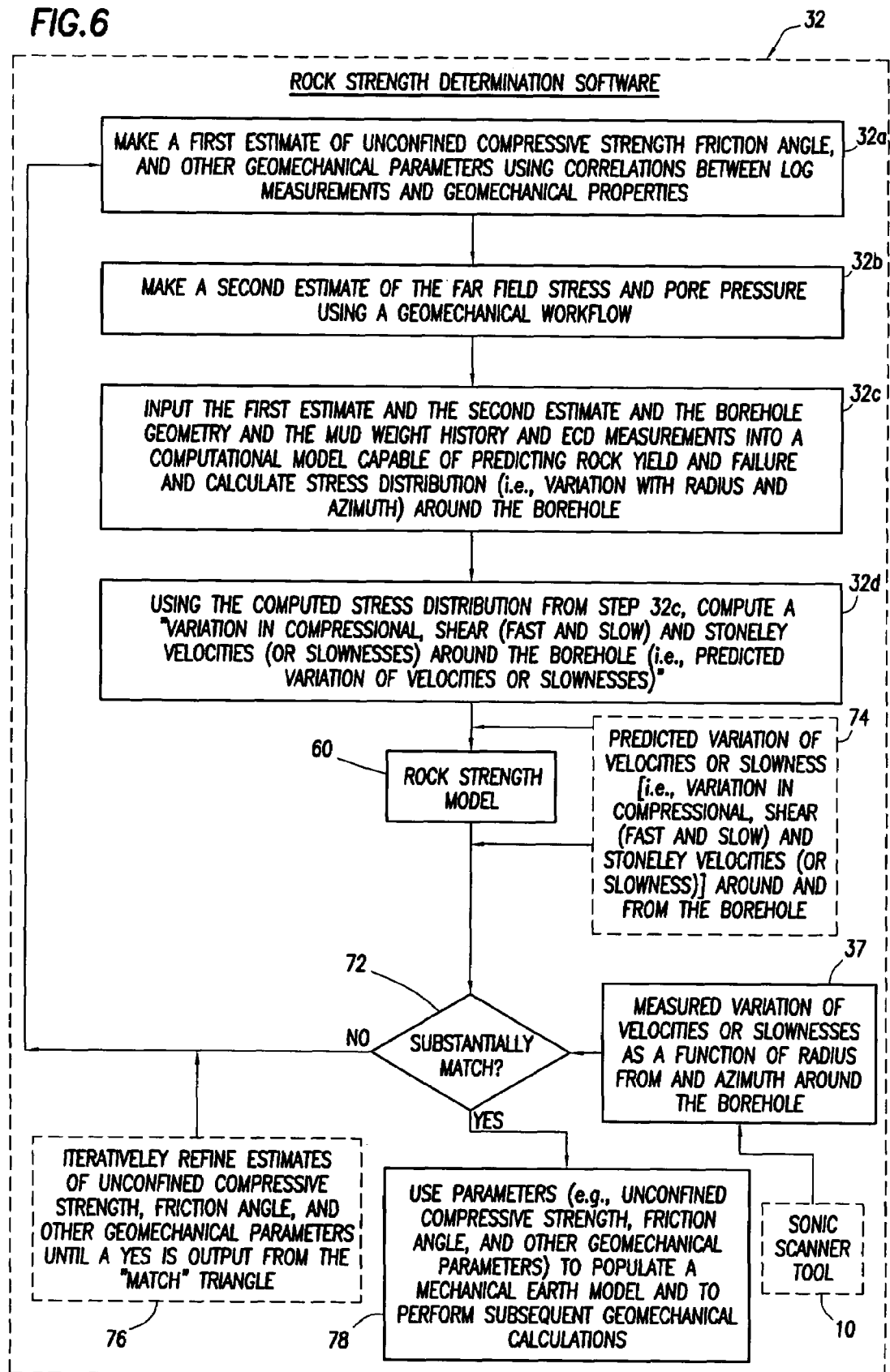
FIGS. 6 and 7 illustrate a detailed construction of the Rock Strength Determination Software which is stored in the computer system of FIG. 2 that is adapted for ultimately populating the Rock Strength Model of the Mechanical Earth Model (MEM) with a set of parameters (such as unconfined compressive strength) and for estimating rock strength from and in response to the radial profiling of acoustic wave velocities using a Sonic Scanner Tool, FIG. 6 illustrating a first construction of the Rock Strength Determination software, FIG. 7 illustrating a second construction of the Rock Strength Determination software which is stored in the memory or program storage device of the computer system shown in FIG. 2.
Figure 7:
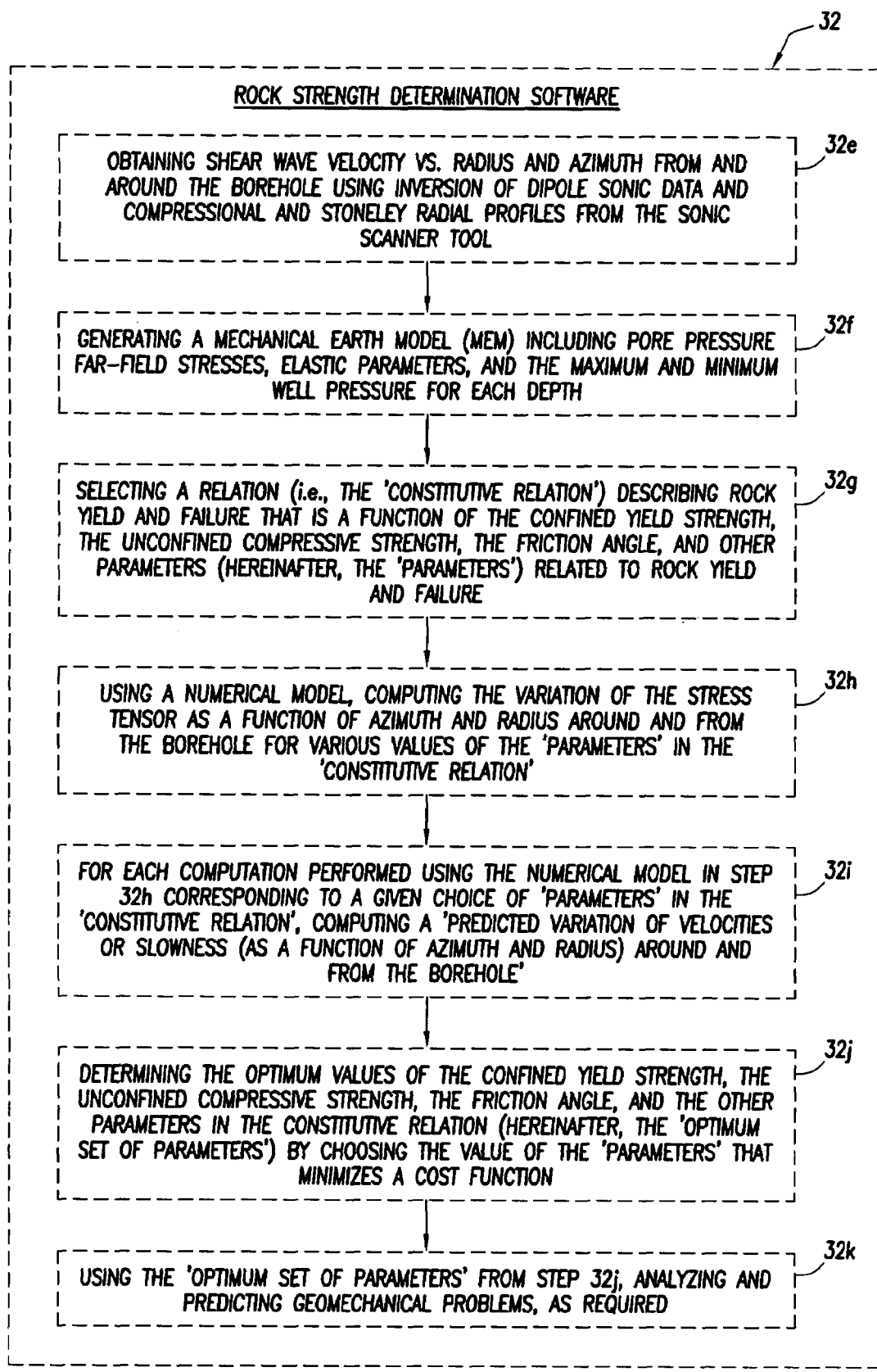

Referring to FIGS. 6 and 7, a more detailed construction of the Rock Strength Determination Software 32 of FIG. 2 is illustrated. FIG. 6 illustrates a first construction of the Rock Strength Determination software 32. FIG. 7 illustrates a second construction of the Rock Strength Determination software 32.

In FIG. 6, in connection with the first construction of the Rock Strength Determination software 32, the Rock Strength Determination software 32 is stored in the memory 30c of the computer system 30 of FIG. 2 and is adapted for: (1) estimating rock strength of a formation in response to the radial profiling of acoustic wave velocities performed by a Sonic Scanner Tool; and (2) populating the Rock Strength Model 60 of the Mechanical Earth Model (MEM) 36 of FIGS. 4 and 5 with a set of 'parameters' (such as unconfined compressive strength, friction angle, and other geomechanical parameters).

In FIG. 6, the Rock Strength Determination software 32, stored in the memory or program storage device 30c of FIG. 2, includes the following steps:
(1) Make a first estimate of unconfined compressive strength and friction angle and other geomechanical parameters using correlations between log measurements and geomechanical properties (step 32a),
(2) Make a second estimate of the far field stress and pore pressure using a geomechanical workflow (step 32b),
(3) Input the 'first estimate' and the 'second estimate' and the 'borehole geometry' and the 'mud weight history' and the 'Equivalent Circulating Density (ECD) measurements' into a computational model capable of predicting rock yield and failure and calculate stress distribution (i.e., variation with radius and azimuth) around the borehole (step 32c), and
(4) Using the computed stress distribution of step 32c, compute a 'variation in compressional, shear (fast and slow) and Stoneley velocities (or slownesses) around the borehole (i.e., Predicted variation of velocities of slownesses)' (step 32d).

In step 32c set forth above, the term 'ECD' refers to the 'Equivalent Circulating Density'. The 'Equivalent Circulating Density (ECD)' is the 'effective density' exerted by a circulating fluid against the formation that takes into account the pressure drop in the annulus above the point being considered. The 'ECD' is calculated as: "d+P/0.052*D", where d is the mud weight (ppg), P is the pressure drop in the annulus between depth D and surface (psi), and D is the true vertical depth (feet). The ECD is an important parameter in avoiding kicks and losses, particularly in wells that have a narrow window between the fracture gradient and pore-pressure gradient. It can be measured downhole using LWD pressure gages.

As a result, step 32d of FIG. 6 will generate: a 'Predicted variation of velocities or slowness [i.e., a variation in compressional, shear (fast and slow) and Stoneley velocities (or slowness)] around the borehole' 74. In FIG. 6, as a result, the Rock Strength model 60 will receive and store a 'rock strength value' 74 which is equal to: the 'Predicted variation of velocities or slowness [i.e., variation in compressional, shear (fast and slow) and Stoneley velocities (or slowness)] around the borehole' 74. The 'rock strength value' 74 in the Rock Strength model 60 is input to the 'Substantially Match?' decision triangle 72. In FIG. 6, recall from FIG. 2 that the Sonic Scanner tool 10 generates 'input data' 37 which represents a 'measured variation of velocities or slownesses as a function of radius from and azimuth around the borehole' 37. The 'measured variation of velocities or slownesses as a function of radius from and azimuth around the borehole' 37 from the Sonic Scanner Tool 10 is also input to the 'Substantially Match?' decision triangle 72. In FIG. 6, as a result, in the 'Substantially Match?' decision triangle 72, the 'Predicted variation of velocities or slowness [i.e., variation in compressional, shear (fast and slow) and Stoneley velocities (or slowness)] around the borehole' 74 is compared with the 'measured variation of velocities or slownesses as a function of radius from and azimuth around the borehole' 37. In response to the completion of the 'compare' operation performed by the 'Substantially Match?' decision triangle 72, if the 'Predicted variation of velocities or slowness [i.e., variation in compressional, shear (fast and slow) and Stoneley velocities (or slowness)] around the borehole' 74 does not substantially match the 'measured variation of velocities or slownesses as a function of radius from and azimuth around the borehole' 37 from the Sonic Scanner tool 10, the next step involves 'iteratively refining estimates of unconfined compressive strength, friction angle, and other geomechanical parameters until a Yes is output from the match triangle' 76. Return to step 32a of the Rock Strength Determination software 32 for subsequent processing. However, if the 'Predicted variation of velocities or slowness [i.e., variation in compressional, shear (fast and slow) and Stoneley velocities (or slowness)] around the borehole' 74 does, in fact, substantially match the 'measured variation of velocities or slownesses as a function of radius from and azimuth around the borehole' 37 from the Sonic Scanner tool 10, the 'rock strength value' 74 in the Rock Strength model 60 of FIGS. 4, 5, and 6 is deemed to be accurate and the Rock Strength model 60 will generate accurate predictions. In that case, the set of 'parameters' used during the last iteration of step 32*a* of the Rock Strength Determination software 32, which includes the unconfined compressive strength and the friction angle and the other geomechanical parameters, are used to populate the Mechanical Earth Model (MEM) 36 (and, in particular, the Rock Strength model 60 of the MEM 36) for use when the Rock Strength Model 60 performs subsequent geomechanical calculations 78.

In FIG. 7, in connection with the second construction of the Rock Strength Determination software 32, when the processor 30*a* of the computer system 30 of FIG. 2 executes the Rock Strength Determination software 32 stored in the memory or program storage device 30*c*, the following steps are practiced by the processor 30*a*:

Step 32*e*: Obtaining the shear wave velocity versus radius and azimuth from and around the borehole, using 'inversion of dipole sonic data' and 'compressional and Stoneley radial profiles', from the Sonic Scanner Tool 10, Step 32*f*: Generating a Mechanical Earth Model (MEM) 36 of FIGS. 4 and 5 including pore pressure, far field stresses, elastic parameters, and the maximum and minimum well pressure for each depth, Step 32*g*: Selecting a relation (referred to as the 'constitutive relation') describing rock yield and failure that is a function of the confined yield strength, the unconfined compressive strength, the friction angle, and other parameters (hereinafter called 'parameters') related to rock yield and failure, Step 32*h*: Using a numerical model, computing the variation of the stress tensor as a function of azimuth and radius around and from the borehole for various values of the 'parameters' in the 'constitutive relation', Step 32*i*: For each computation performed using the numerical model in step 32*h* corresponding to a given choice of 'parameters' in the 'constitutive relation', computing a 'Predicted variation of velocities or slowness (as a function of azimuth and radius) around and from the borehole', Step 32*j*: Determining the optimum values of the confined yield strength, the unconfined compressive strength, the friction angle, and other parameters in the constitutive relation (hereinafter called the 'optimum set of parameters') by choosing the value of the 'parameters' that minimizes a cost function, and Step 32*k*: Using the 'optimum set of parameters' from step 32*j*, analyzing and predicting geomechanical problems, as required.

In FIG. 7, each of the steps 32*e* through 32*k* will be discussed below in greater detail.

Step 32*e* of FIG. 7: Obtaining the Shear Wave Velocity Versus Radius and Azimuth from and Around the Borehole, Using 'Inversion of Dipole Sonic Data' and 'Compressional and Stoneley Radial Profiles', from the Sonic Scanner Tool 10

In step 32*e*, using the output from the Sonic Scanner tool 10 of FIG. 1, compute the dipole radial profile, including the 'shear wave velocity vs radius and azimuth from and around the borehole', by using the methods described by B. K. Sinha in the following 'Sinha patents': (1) Sinha, B. K. (1998) Method for estimating formation in-situ stress magnitudes using a sonic borehole tool, U.S. Pat. No. 5,838,633; (2) Sinha, B. K. (2002) Determining stress parameters of formations from multi-mode velocity data, U.S. Pat. No. 6,351,991; and (3) Sinha, B. K. (2006) Determination of stress characteristics of earth formations, U.S. Pat. No. 7,042,802. Then, calibrate the drilling hydraulics using the 'while-drilling' annular pressure measurement and determine the maximum and minimum well pressure for each depth, as described by Bratton et al in the following 'Bratton documents': (1) Bratton, T. R. et al., 2004, Rock strength parameters from annular pressure while drilling and dipole sonic dispersion analysis: Proceedings of the 45th Annual Logging Symposium, SPWLA, and (2) Bratton, T. R. et al. (2005) Methods and systems for determining formation properties and in-situ stresses, U.S. Pat. No. 6,904,365.

Step 32*f* of FIG. 7: Generating a Mechanical Earth Model (MEM) 36 of FIGS. 4 and 5 Including Pore Pressure, Far Field Stresses, Elastic Parameters, and the Maximum and Minimum Well Pressure for Each Depth In step 32*f*, build a 'Mechanical Earth Model (MEM)', such as MEM 36 of FIG. 5, including pore pressure, far-field stresses, and elastic parameters using established geomechanical methods. For example, the pore pressure may be measured using the RFT/MDT or predicted using elastic wave velocity or resistivity measurements, the vertical stress may be estimated from an integral of the density log, while the minimum horizontal stress can be determined from leak-off test data. The maximum horizontal stress is more difficult to estimate, and approximations, such as equating the maximum horizontal stress to some multiple of the minimum horizontal stress or a weighted average of the minimum horizontal stress and vertical stress, are often made. Another approach is to estimate the maximum horizontal stress from Sonic Scanner data, as described by Sinha in the above referenced 'Sinha patents' and as described by Bratton et al in the above referenced 'Bratton documents', which are incorporated herein by reference. In complex geometries, such as near salt bodies, the far-field stress state can be estimated using numerical modeling, such as a finite element, finite difference, or finite volume methods.

Step 32*g* of FIG. 7: Selecting a Relation (Referred to as the 'Constitutive Relation') Describing Rock Yield and Failure That is a Function of the Confined Yield Strength, the Unconfined Compressive Strength the Friction Angle and Other Parameters (Hereinafter Called 'Parameters') Related to Rock Yield and Failure In step 32*g*, choose a relation (called the 'constitutive relation') which describes rock yield and failure that is a function of the confined yield strength, friction angle and other parameters related to rock yield and failure.

Step 32*h* of FIG. 7: Using a Numerical Model, Computing the Variation of the Stress Tensor as a Function of Azimuth and Radius Around and From the Borehole for Various Values of the 'Parameters' in the 'Constitutive Relation'

In step 32*h*, using a numerical model such as a finite element, finite difference or finite volume method (where the codes FLAC, FLAC3D from Itasca, or Abaqus from ABAQUS, Inc. are examples), compute the variation of the stress tensor as a function of azimuth and radius around and from the borehole for various values of the parameters in the constitutive relation.

Step 32*i* of FIG. 7: For Each Computation Performed Using the Numerical Model in Step 32*h* Corresponding to a Given Choice of 'Parameters' in the 'Constitutive Relation', Computing a 'Predicted Variation of Velocities or Slowness (as a Function of Azimuth and Radius) Around and From the Borehole'

In step 32*i*, for each computation performed using the numerical model corresponding to a given choice of parameters in the constitutive relation, compute the variation of velocity as a function of azimuth and radius around and from the borehole using a theory such as that presented by 'Sayers and Kachanov' in the following 'Sayers and Kachanov documents': (1) Sayers, C. M., and M. Kachanov, 1991, A simple technique for finding effective elastic constants of cracked solids for arbitrary crack orientation statistics: International Journal of Solids and Structures, 12, 81-97; and (2) Sayers, C. M., and M. Kachanov, 1995, Microcrack-induced elastic wave anisotropy of brittle rocks: Journal of Geophysical Research, 100, 4149-4156. Alternatively, compute the variation of velocity as a function of azimuth and radius around and from the borehole using a theory such as that presented by 'Sayers' in the following 'Sayers documents': (1) Sayers, C. M., 2002, Stress-dependent elastic anisotropy of sandstones: Geophysical Prospecting, 50, 85-95; (2) Sayers, C. M., 2005, Sensitivity of elastic-wave velocities to stress changes in sandstones: The Leading Edge, December 2005, 1262-1266; and (3) Sayers, C. M., 2006, Effects of borehole stress concentration on elastic wave velocities in sandstones: 76th Annual International Meeting, SEG, Expanded Abstracts.

Step 32*j*: Determining the Optimum Values of the Confined Yield Strength, the Unconfined Compressive Strength, the Friction Angle, and Other Parameters in the Constitutive Relation (Hereinafter Called the 'Optimum Set of Parameters') by Choosing the Value of the 'Parameters' That Minimizes a Cost Function In step 32*j*, determine the optimum values of the unconfined compressive strength and other parameters in the constitutive model by choosing the value of 'unconfined compressive strength', $C_0$, 'friction angle', and other parameters related to rock yield and failure, and selecting the value of these parameters that gives the best agreement with the observed shear-wave velocity profile. This may be done by choosing the vector of parameters c that minimizes the following 'cost function':

$$\text{cost function} = \mu_m = \sum_{i=1}^{N} \left| \frac{V_i^{data} - V_i^{pred}(c)}{\sigma_i} \right|^m$$

where, in FIG. 6, the term '$V_i^{data}$' in the cost function represents the 'Measured Variation of Velocities or Slownesses as a function of radius from and azimuth around the borehole' 37 of FIG. 6, and the term '$V_i^{pred}$' in the cost function represents the 'Predicted variation of Velocities or Slowness [i.e., variation in compressional, shear (fast and slow) and Stoneley velocities (or slowness)] around and from the borehole' 74 of FIG. 6.

In FIG. 6, the above referenced 'cost function' is minimized when a 'substantial match' is achieved in the 'Substantially Match' decision triangle 72 of FIG. 6. That is, when a 'substantial match' is achieved in the 'Substantially Match' decision triangle 72 of FIG. 6, the above referenced 'cost function' is minimized.

In FIG. 7, in the above referenced 'cost function', the choice m=2 corresponds to least-squares inversion, while the choice m=1 is more robust in the presence of noise. Various elastoplastic models may have several parameters, resulting in a multi-dimensional parameter space described by the parameter vector c. If the number of parameters is relatively small, the minimum of the above referenced 'cost function' can be found by evaluating the function on a regular grid of points in a coordinate system with axes corresponding to the different parameters. Alternatively, one of the more efficient numerical methods described by 'Press et al' (see below) may be used for this purpose by optimizing the sampling of the parameter space in step 32*i* of FIG. 7, discussed above. The maximum horizontal stress (and other components) may also be included as parameters in this inversion. The 'Press et al' document is identified as follows: Press, W. H., Teukolsky, S. A., Vetterling, W. T. and Flannery, B. P. (1992) Numerical Recipes in Fortran: Cambridge University Press, Cambridge, UK.

Step 32*k* of FIG. 7: Using the 'Optimum Set of Parameters' from Step 32*i*, Analyzing and Predicting Geomechanical Problems, as Required In step 32*k*, use the optimum set of parameters, such as confined yield strength and friction angle, to analyze and predict geomechanical problems as required.

Refer now to FIGS. 11 through 15 of the drawings.

Figure 11:
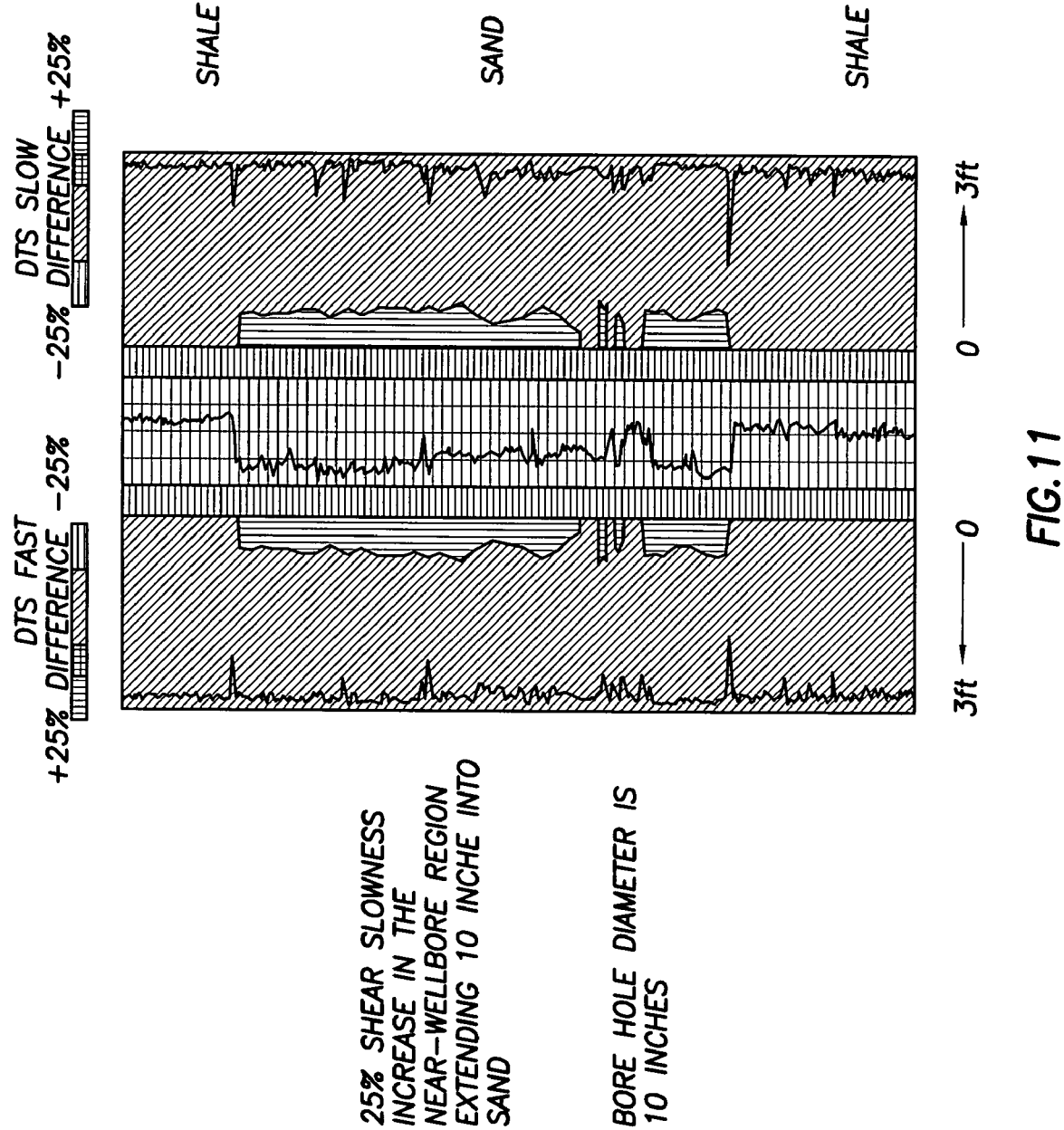
FIG. 11 illustrates Shear radial profiles showing reduced shear wave velocity (increased shear wave slowness) due to formation yield around a borehole.

In FIG. 11, the drilling of wells leads to significant changes in the stress field in the vicinity of the borehole, and these changes in stress may lead to yield or failure of the rock. Recent developments in sonic logging have made it possible to map the variation in elastic wave velocities in three-dimensions (3D) around the borehole (Pistre et al., 2005). Radial variations in compressional wave (P-wave) velocity may be determined by using monopole acquisition with a wide range of transmitter/receiver spacing; whereas, radial variations in shear wave (S-wave) velocity may be obtained by inverting borehole flexural wave dispersion curves. An example is shown in FIG. 11, where areas of reduced shear-wave velocity around the borehole are seen. The reduction in shear-wave velocity seen in FIG. 11 results from formation yield and is seen to extend 10 inches into the formation with an average 25% decrease in shear-wave velocity in the near-wellbore region. The yield that occurs is a function of both the strength parameters of the rock, the state of stress in the rock and the minimum and maximum wellbore pressure to which the formation has been exposed. The vertical stress may be estimated from an integral of the density log, while the minimum horizontal stress can be determined from leak-off test data. The maximum horizontal stress is more difficult to estimate, and approximations such as equating the maximum horizontal stress to some multiple of the minimum horizontal stress or a weighted average of the minimum horizontal stress and vertical stress is often made. Another approach is to estimate the maximum horizontal stress from Sonic Scanner data as described by Sinha (1998, 2002, 2006) and Bratton et al. (2004, 2005) and are incorporated herein by reference. Rock strength may be estimated using laboratory measurements made on cores or from empirical correlations between strength and a log-derived property as described above. This specification discloses a new method of determining rock strength directly from acoustic radial profiles without the need for such empirical methods.

Figure 12:
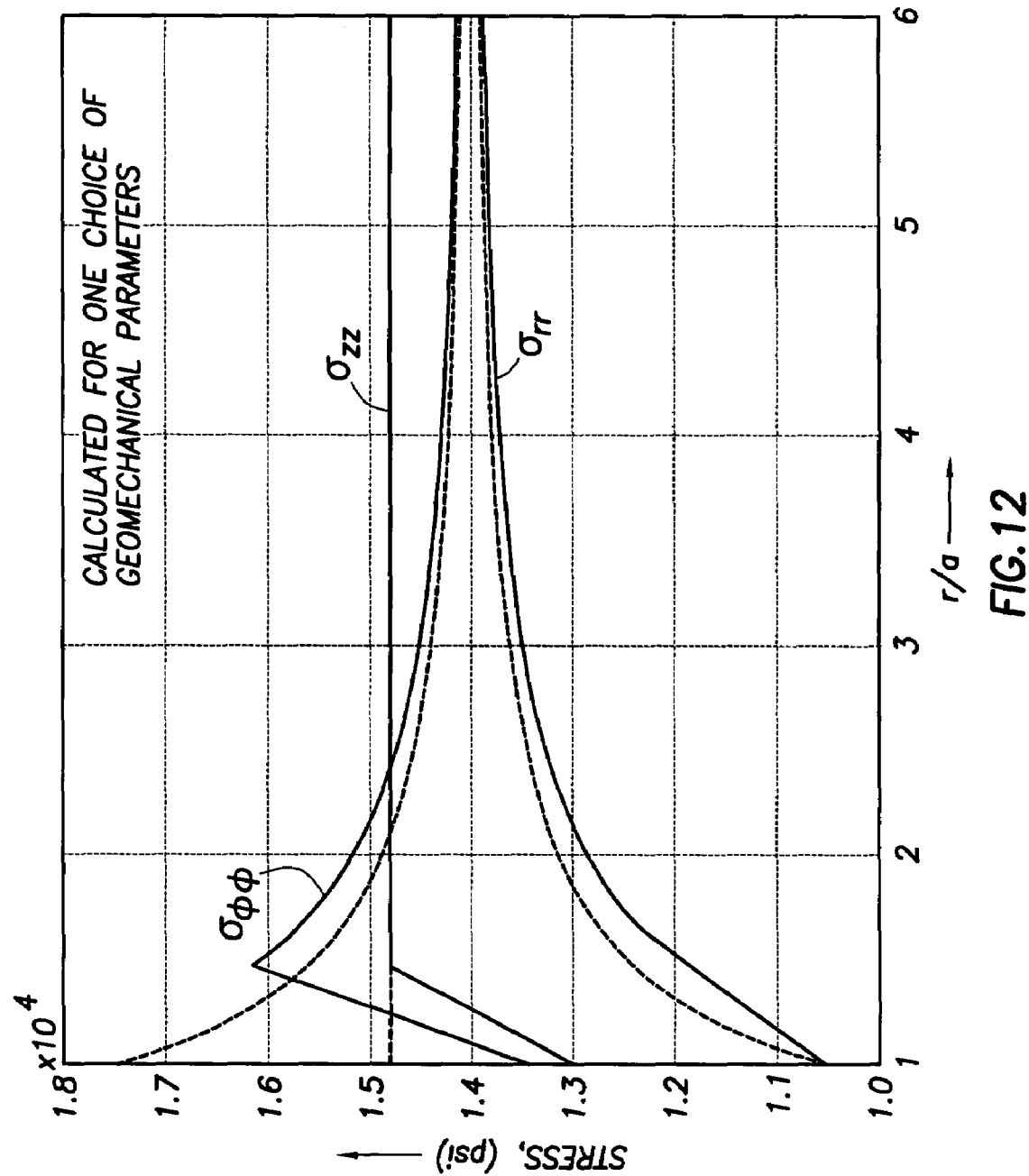
FIG. 12 illustrates Stress distribution around the borehole shown in FIG. 11 calculated by assuming (i) an elastic calculation (dashed curves) and (ii) an elastoplastic calculation using the unconfined compressive strength obtained using an empirical method that uses a correlation between unconfined compressive strength and shear modulus (full curves)
Figure 13:
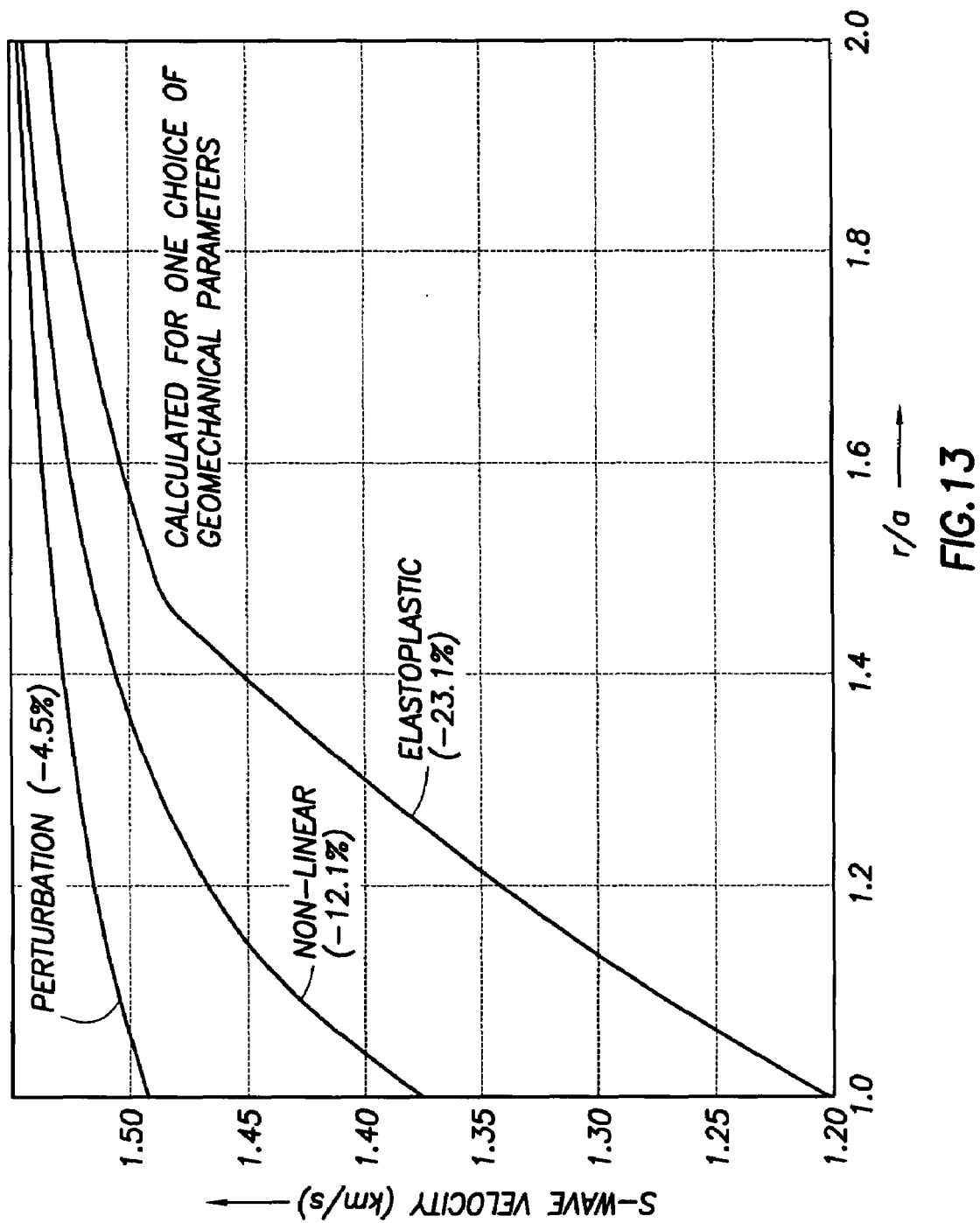
FIG. 13 illustrates Shear-wave velocity calculated using the stress distribution shown in FIG. 12 calculated by assuming (i) perturbation theory (blue curve), (ii) a non-linear elastic theory (red curve) and (iii) an elastoplastic theory.

In FIGS. 12 and 13, in order to illustrate the method, FIG. 12 shows the distribution in stress which occurs around the borehole in FIG. 11 as a function of radius from the borehole r divided by the borehole radius a computed assuming (i) an elastic calculation (i.e. assuming no rock yield) and (ii) an elastoplastic calculation using the unconfined compressive strength obtained using an empirical method that uses a correlation between unconfined compressive strength and shear modulus. For the purpose of illustration, the case in which the two principal horizontal stresses are taken as equal is shown in the figures in this document, but the case of unequal far-field horizontal stresses may be easily treated using the same approach. It is seen that the increase in stress around the borehole predicted by the elastic calculation causes the rock to yield and fail. As a result, the stress in the yielded zone is reduced. The radius of this yielded zone is a function of effective stress and rock strength, and can be quantified using broadband dipole shear measurements—see Bratton et al. (2004, 2005) for a discussion. To estimate the effective stress requires knowledge of the far field stresses and the maximum and minimum well pressure for each depth, a relation describing rock yield and failure, and a numerical model such as a finite element, finite difference or finite volume method. FIG. 12 shows the variation in shear wave velocity with radius predicted using the distribution in stress shown in FIG. 12. It is seen that the yielded zone predicted by the elastoplastic theory causes an increased reduction in the shear wave velocity near the wellbore, and it is characterizing the extent of the yielded zone that is the key to determining rock strength with the proposed method. Bratton et al (2004, 2005) determine the radius of the yielded zone from the point at which the shear-wave velocity begins to decrease as the borehole is approached. However, it is seen in FIG. 13 that the reduction in velocity begins outside the yielded zone, especially when the non-linear variation in velocity with stress is included, and picking the radius at which the velocity begins to first decrease may give an inaccurate estimate of formation strength. The proposed method overcomes this problem.

Figure 14:
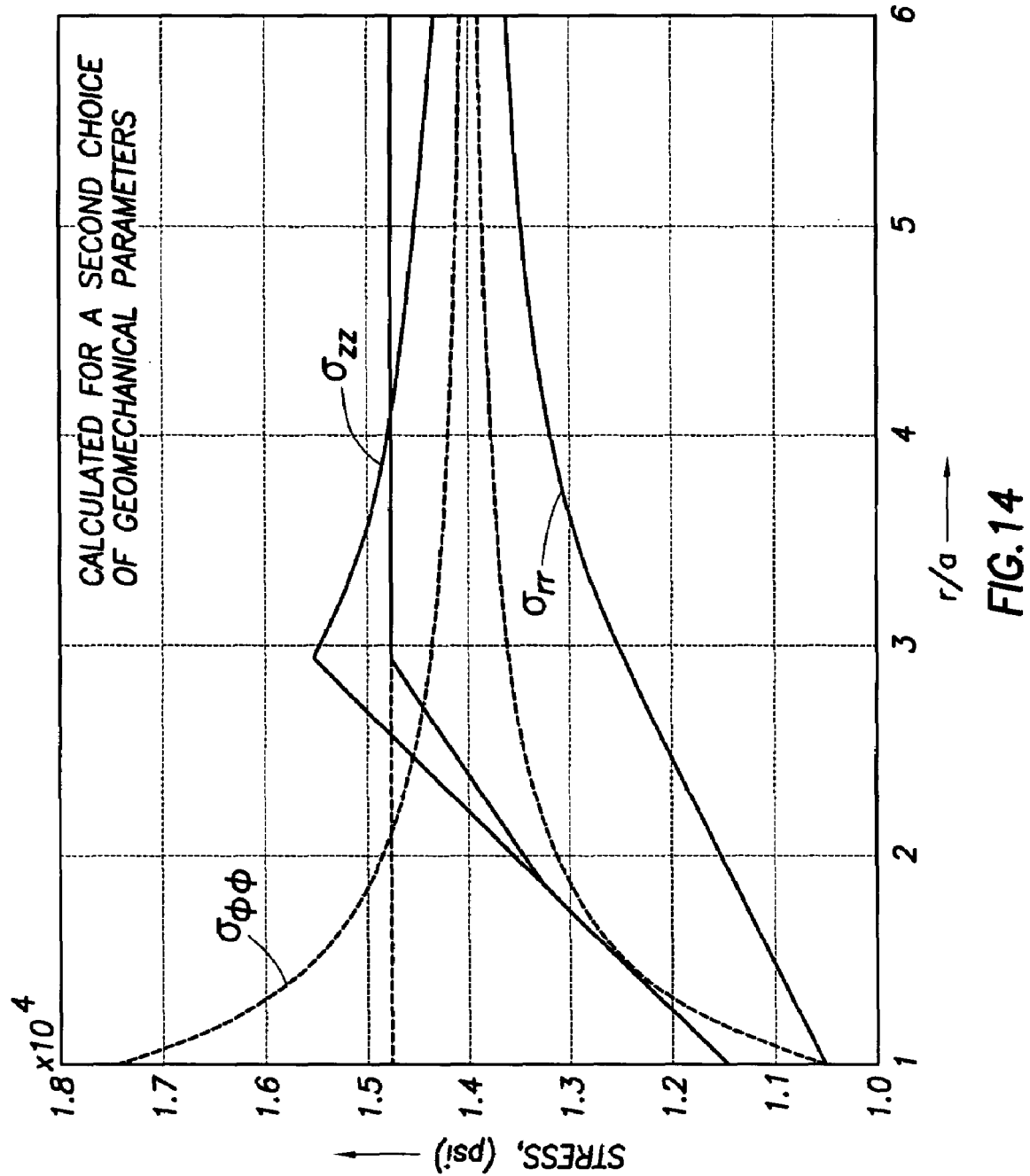
FIG. 14 illustrates an elastoplastic calculation using a value of unconfined compressive strength chosen to match the observed variation in velocities from and around the borehole.
Figure 15:
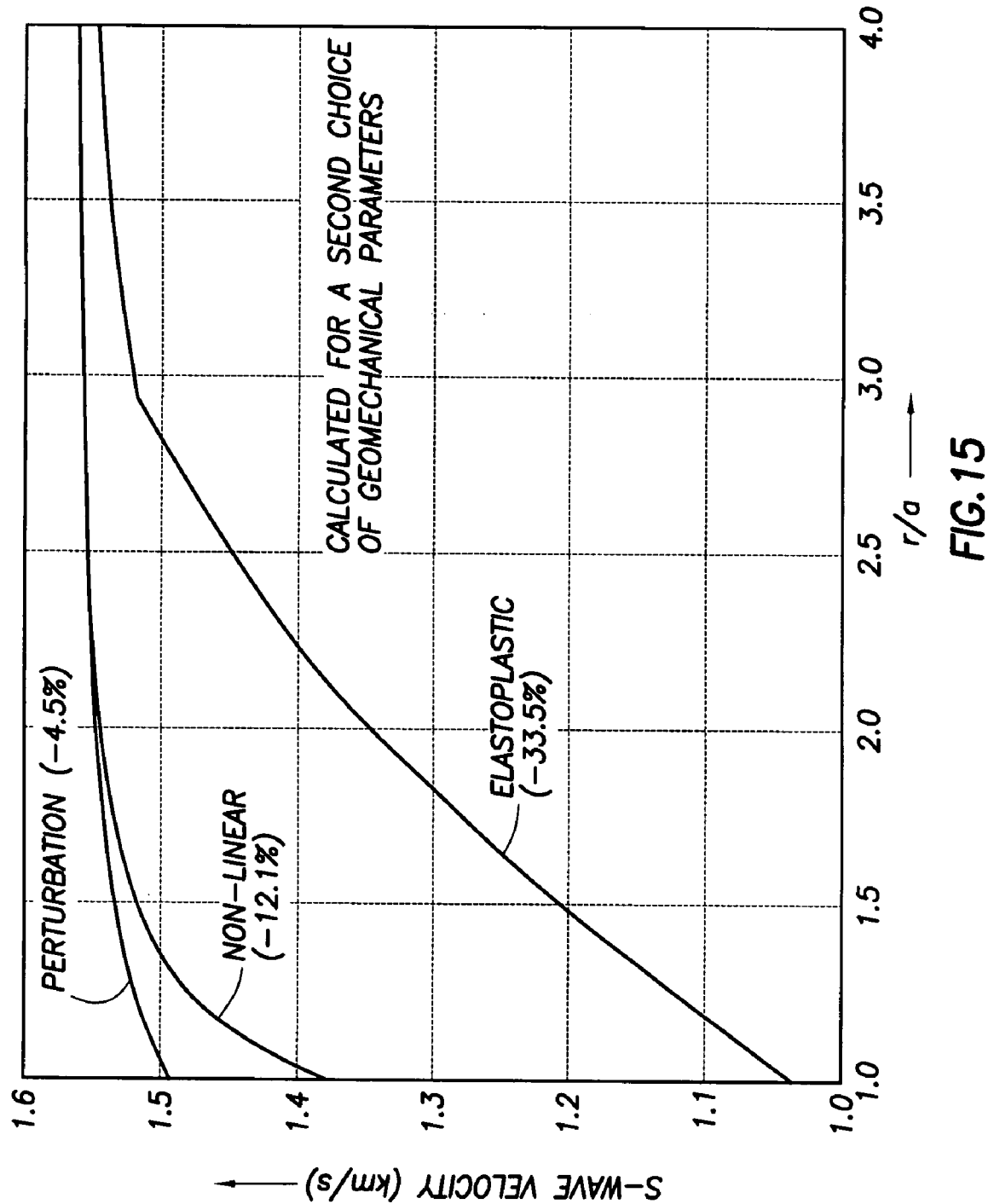
FIG. 15 illustrates Shear-wave velocity calculated using the stress distribution shown in FIG. 12 calculated by assuming (i) perturbation theory (blue curve), (ii) a non-linear elastic theory (red curve) and (iii) an elastoplastic theory.

In FIGS. 8, 11, 14, and 15, although the decrease in S-wave velocity near the borehole is of a similar order of magnitude (25%) to that shown in FIG. 8, the radial extent is much less. In contrast, the computed stress distribution and shear-wave velocity computed for an unconfined compressive strength is 1000 psi as shown in FIGS. 14 and 15. In agreement with FIG. 11, the decrease in shear-wave velocity extends further into the formation with an average decrease close to that shown in FIG. 11.

The optimum value of the confined yield strength can be obtained by computing the variation in shear-wave velocity for a range of possible values of confined yield strength, friction angle, and other parameters related to rock yield and failure and selecting the value of these parameters that gives the best agreement with the observed shear-wave velocity profile. This may be done by choosing the vector of parameters c that minimizes the above referenced cost function $$\mu_m = \sum_{i=1}^{N} \left| \frac{V_i^{data} - V_i^{pred}(c)}{\sigma_i} \right|^m \quad (1)$$

The choice m=2 corresponds to least-squares inversion, while the choice m=1 is more robust in the presence of noise. Various elastoplastic models may have several parameters, resulting in a multi-dimensional parameter space described by the parameter vector c. If the number of parameters is relatively small, the minimum of equation (1) can be found by evaluating the function on a regular grid of points in a coordinate system with axes corresponding to the different parameters. Alternatively, one of the more efficient numerical methods described by Press et al (1992) may be used for this purpose.

It should be noted that the radial profiles obtained using the Sonic Scanner tool are obtained by inverting measurements of slowness versus frequency. The optimum value of c may therefore also be estimated by calculating the slowness as a function of frequency using a forward model of wave propagation in a borehole with the computed stress distribution and choosing the value of c that best matched the observed dispersion curve by minimizing a cost function similar to that in equation (1).

It should be noted that the 'new method for determination of rock strength' of the formation that is disclosed in this specification includes the ability to calculate wave velocities as a function of stress. In the above example, this was done using the theory presented by Sayers and Kachanov (1991, 1995) and Sayers (2002, 2005, 2006) which is incorporated herein by reference. The use of this theory is outlined below. Other methods of calculating velocity as a function of stress such as grain contact theory can also be used.

A functional description of the operation of the Rock Strength Determination software 32, in the systems (and methods) shown in FIGS. 2, 5, 6, and 7, will be set forth in the following paragraphs with reference to FIGS. 1 through 15 of the drawings.

The Rock Strength Determination software 32 of FIGS. 2 and 5 practices a 'new method for the determination of rock strength' of an Earth formation. The 'new method' is adapted for determining the rock strength in a rock strength model of a Mechanical Earth Model (MEM) in response to an 'output' from the Sonic Scanner tool (where the 'output' includes a measured variation of velocities or slownesses as a function of radius from and azimuth around the borehole), the 'new method' including the following steps: (1) the Mechanical Earth Model (MEM) makes 'predictions of the variation of stress, and hence velocity, as a function of distance from, and azimuth around, the borehole' (hereinafter the 'predictions'); and (2) the rock strength in the Mechanical Earth Model (MEM) is changed until the 'predictions' agree with or substantially match a 'measured variation in velocity around and from the borehole' that is generated by a 'Sonic Scanner tool'. The 'predictions' will agree with or substantially match the 'measured variation in velocity around and from the borehole' that is generated by a 'Sonic Scanner tool' when a 'cost function' is minimized, where the 'cost function' is set forth again below as follows:

$$\mu_m = \sum_{i=1}^{N} \left| \frac{V_i^{data} - V_i^{pred}(c)}{\sigma_i} \right|^m$$

where, in FIG. 6, the term '$V_i^{data}$' in the cost function represents the 'Measured Variation of Velocities or Slownesses as a function of radius from and azimuth around the borehole' 37 of FIG. 6, and the term '$V_i^{pred}$' in the cost function represents the 'Predicted variation of Velocities or Slowness [i.e., variation in compressional, shear (fast and slow) and Stoneley velocities (or slowness)] around and from the borehole' 74 of FIG. 6.

When the 'predictions' substantially match the 'measured variation in velocity around and from the borehole', a set of parameters (for example, unconfined compressive strength, friction angle, and other geomechanical parameters), which were used to generate the 'predictions', are then used in subsequent calculations.

In FIG. 1, the Sonic Scanner tool generates acoustic energy from the transmitters 20 and/or 22, the acoustic energy propagating uphole along the borehole walls and being received by the receivers 18 where the receivers 18 will receive 'acquired acoustic measurements'. The 'acquired acoustic measurements' received by the receivers 18 need to be 'processed' to provide the 'desired formation properties'. This processing can be performed by the downhole processing unit 26 (i.e., a 'computer system') of the Sonic Scanner tool 10 or FIG. 1; however, in addition, this processing can be performed by other computer systems situated at the Earth's surface. One such computer system 30 is illustrated in FIG. 2. The computer system 30 of FIG. 2 receives, as 'input data' 37, an output signal from the Sonic Scanner tool 10 of FIG. 1, where that 'input data' 37 includes: a 'measured variation of velocities or slownesses as a function of radius from and azimuth around the borehole'. The processor 30a of the computer system 30 executes the Rock Strength Determination software 32, using the 'input data' 37 which includes the 'measured variation of velocities or slownesses as a function of radius from and azimuth around the borehole', and, responsive thereto, the processor 30a generates a revised and accurate 'Rock Strength Model' 60 of FIG. 6, and, in addition, an 'optimum set of parameters', including unconfined compressive strength and friction angle and other geomechanical parameters, which are used to populate the Mechanical Earth Model 36 of FIG. 5, including the Rock Strength Model 60 of FIGS. 5 and 6. The Recorder or Display device 30d of computer system 30 can now record or display the aforementioned 'optimum set of parameters'. When the processor 30a generates a revised and accurate 'Rock Strength model' 60 of FIG. 6, the 'Rock Strength Model' 60 of FIGS. 5 and 6 will now generate accurate 'predictions'. When the processor 30a executes the Rock Strength Determination software 32 (while using the 'input data' 37 from the Sonic Scanner tool 10 which includes the 'measured variation of velocities or slownesses as a function of radius from and azimuth around the borehole'), the processor 30a first executes the method practiced by the system illustrated in FIG. 5. In FIG. 5, when the processor executes the method practiced by the system illustrated in FIG. 5, the following steps of the method are practiced and performed:

(1) In FIG. 5, in a first application, a Mechanical Earth Model (MEM) 36 is created based on the 'workflow models' 54, 56, 58, 60, 62, 64, 66, and 68 illustrated in FIG. 4, namely, the framework model, the petrophysics model, the mechanical stratigraphy model, the rock strength model 60, the overburden model, the pore pressure model, stress direction model, and horizontal stress model. Note, in particular, the Rock Strength model 60 associated with the Mechanical Earth Model (MEM) 36 illustrated in FIG. 5. In FIG. 5, data 182, such as imagining, logs, sonic scanners and other pertinent data, may be input into the 'workflow models' (including the rock strength model 60) of the MEM 36 in FIG. 5 in order to generate the Mechanical Earth Model (MEM) 36. Simulations 162 are performed based on the MEM 36 to generate predictions 166, such as yield and failure. The simulations 162 may be based on data 164, such as APWD mud logs; the simulations 162 generate predictions 166, such as failure and yield. Observations 168, such as yield and failure, may also made using measurements from instruments 170, such as imagers, sonic scanners and calipers; the observations 168 and predictions 166 may then be compared in the compare triangle 172. Where the comparisons indicate agreement (see 'Yes' from triangle 172), the predictions are considered accurate 174. If not, the MEM 36 may be revised 176 [see 'Revise Mechanical Earth Model (MEM)' 176 in FIG. 5] until the predictions 166 agree with and substantially match the observations 168 (in the compare triangle 172) and, as a result, the predictions 166 are determined to be accurate 174.

(2) In FIG. 5, in a second application, simulations 162A are performed based on the MEM 36 to generate predictions 166A, such as yield and failure. The simulations involve various models capable of generating the predictions 166A, such as geometry, pressure and production. Observations 168A, such as pressure response, seismic and production, may also made using measurements from instruments 170A, such as logs. The observations 168A and predictions 166A may then be compared in the compare triangle 172A. Where the comparisons indicate agreement (see 'Yes' from compare triangle 172A), the predictions 166A substantially match the observations 168A. As a result, the predictions 166A are considered accurate 174A. If not, the MEM 36 may be revised 176A [see 'Revise Mechanical Earth Model (MEM)' 176A] until the predictions 166A agree with and substantially match the observations 168A (in the compare triangle 172A) and, as a result, the predictions 166A are determined to be accurate 174A.

In FIG. 5, during the execution of the method described above with reference to FIG. 5, the 'Revise MEM' step 176 and the 'Revise MEM' step 176A are updating the MEM 36. In particular, the 'Revise MEM' step 176 and the 'Revise MEM' step 176A of FIG. 5 are updating the 'Rock Strength Model' 60 of FIG. 5. The 'Revise MEM' steps 176, 176A of FIG. 5 each include the Rock Strength Determination software 32 of FIG. 2. The Rock Strength Determination software 32 of FIG. 2 (disposed within the 'Revise MEM' step 176 and the 'Revise MEM' step 176A of FIG. 5) is the computer program that is responsible for updating the 'Rock Strength Model' 60 of FIGS. 5 and 6.

A more detailed description of the construction and functional operation of the Rock Strength Determination software 32 of FIGS. 2 and 5, that is disposed within the 'Revise MEM' step 176/176A of FIG. 5, is illustrated in FIG. 6.

In FIG. 6, when the processor 30a of computer system 30 of FIG. 2 executes the Rock Strength Determination software 32, the Rock Strength Determination software 32 will update the 'Rock Strength Model' 60 of FIGS. 5 and 6. Recall that a 'constitutive relation' is chosen that describes rock yield and failure, the 'constitutive relation' being a function of confined yield strength, friction angle, unconfined compressive strength, and other parameters related to rock yield and failure. In addition, recall step 32h of FIG. 7 wherein: "Using a numerical model, computing the variation of the stress tensor as a function of azimuth and radius around and from the borehole 'for various values of the parameters' in the constitutive relation"; and recall step 32i of FIG. 7 wherein: "For each computation performed using the numerical model in step 32h corresponding to a given choice of parameters in the constitutive relation, compute a Predicted variation of velocities or slowness around and from the borehole". As a result, in FIG. 7, when the Rock Strength Determination software 32 of FIGS. 2 and 6 updates the 'Rock Strength Model' 60 of FIG. 6, the Rock Strength Determination software 32 of FIG. 7 (in conjunction with processor 30a) will practice the following steps: (1) "using a numerical model, compute the variation of the stress tensor as a function of azimuth and radius around and from the borehole 'for various values of the parameters' in the constitutive relation" (step 32h), and (2) "for each computation performed using the numerical model in step 32h corresponding to a given choice of parameters in the constitutive relation, compute a Predicted variation of velocities or slowness around and from the borehole" (step 32i). However, in FIG. 6, in order to practice (step 32h) and (step 32i) of FIG. 7 in the manner indicated above, the following method steps of FIG. 6 are performed by the processor 30a of FIG. 2: (1) Make a first estimate of unconfined compressive strength and friction angle and other geomechanical parameters (in the 'constitutive relation') using correlations between log measurements and geomechanical properties (step 32a), (2) Make a second estimate of the far field stress and pore pressure (in the 'constitutive relation') using a geomechanical workflow (step 32b), (3) Input the first estimate and the second estimate and the borehole geometry and the mud weight history and the Equivalent Calculating Density (ECD) Measurements into a computational model capable of predicting rock yield and failure and calculate the stress distribution (i.e., the variation of the stress as a function of radius and azimuth) around the borehole; that is, compute the variation of the stress tensor as a function of azimuth and radius around and from the borehole for various values of the parameters in the 'constitutive relation' (step 32c), and (4) Using the computed stress distribution of step 32c, compute a 'variation in compressional, shear (fast and slow) and Stoneley velocities (or slownesses) around the borehole'; that is, compute the variation of velocity as a function of azimuth and radius around and from the borehole using the theories set forth in 'Sayers and Kachanov' and 'Sayers' referenced above [where the 'variation in compressional, shear (fast and slow) and Stoneley velocities (or slownesses) around the borehole' is called the 'Predicted variation of velocities or slownesses'] (step 32d). As a result, step 32d of FIG. 6 will generate: a 'Predicted variation of velocities or slowness [i.e., variation in compressional, shear (fast and slow) and Stoneley velocities (or slowness)] around the borehole' 74. In FIG. 6, as a result, the Rock Strength model 60 will receive and store a 'rock strength value' 74 which is equal to: the 'Predicted variation of velocities or slowness [i.e., variation in compressional, shear (fast and slow) and Stoneley velocities (or slowness)] around the borehole' 74. The 'rock strength value' 74 in the Rock Strength model 60 is input to the 'Substantially Match?' decision triangle 72. In FIG. 6, recall from FIG. 2 that the Sonic Scanner tool 10 generates 'input data' which represents a 'measured variation of velocities or slownesses as a function of radius from and azimuth around the borehole' 37. The 'measured variation of velocities or slownesses as a function of radius from and azimuth around the borehole' 37 from the Sonic Scanner Tool 10 is also input to the 'Substantially Match?' decision triangle 72. In FIG. 6, as a result, in the 'Substantially Match?' decision triangle 72, the 'Predicted variation of velocities or slowness [i.e., variation in compressional, shear (fast and slow) and Stoneley velocities (or slowness)] around the borehole' 74 is compared with the 'measured variation of velocities or slownesses as a function of radius from and azimuth around the borehole' 37. Recall again that, in the 'Substantially Match' decision triangle 72 of FIG. 6, there will be a 'substantial match' when the above referenced 'cost function' is minimized. In response to the completion of the 'compare' operation performed by the 'Substantially Match?' decision triangle 72, if the 'Predicted variation of velocities or slowness [i.e., variation in compressional, shear (fast and slow) and Stoneley velocities (or slowness)] around the borehole' 74 does not substantially match the 'measured variation of velocities or slownesses as a function of radius from and azimuth around the borehole' 37 from the Sonic Scanner tool 10, the next step involves 'Iteratively refining estimates of unconfined compressive strength, friction angle, and other geomechanical parameters until a Yes is output from the match triangle' (step 76 in FIG. 6). Return to step 32a of the Rock Strength Determination software 32 for subsequent processing. However, if the 'Predicted variation of velocities or slowness [i.e., variation in compressional, shear (fast and slow) and Stoneley velocities (or slowness)] around the borehole' 74 does, in fact, substantially match the 'measured variation of velocities or slownesses as a function of radius from and azimuth around the borehole' 37 from the Sonic Scanner tool 10, the 'rock strength value' 74 in the Rock Strength model 60 of FIGS. 4, 5, and 6 is deemed to be accurate and the Rock Strength model 60 will generate accurate predictions. In that case, the set of 'parameters' used during the last iteration of step 32a of the Rock Strength Determination software 32, which includes the unconfined compressive strength and the friction angle and the other geomechanical parameters, are used to populate the Mechanical Earth Model (MEM) 36 (and, in particular, the Rock Strength model 60 of the MEM 36) for use when the Rock Strength Model 60 performs subsequent geomechanical calculations 78.

The following references (1) through (16) are incorporated herein by reference:

(1) Bratton, T. R. et al., 2004, Rock strength parameters from annular pressure while drilling and dipole sonic dispersion analysis: Proceedings of the 45th Annual Logging Symposium, SPWLA.

(2) Bratton, T. R. et al. (2005) Methods and systems for determining formation properties and in-situ stresses, U.S. Pat. No. 6,904,365.

(3) Mavko, G., T. Mukerji, and N. Godfrey, 1995, Predicting stress-induced velocity anisotropy of rocks: Geophysics, 60, 1081-1087.

(4) Pistre, V., T. Kinoshita, T. Endo, K. Schilling, J. Pabon, B. Sinha, T. Plona, T. Ikegami, and D. Johnson, 2005, A modular wireline sonic tool for measurements of 3D (azimuthal, radial, and axial) formation acoustic properties: Proceedings of the 46th Annual Logging Symposium, SPWLA.

(5) Plumb, R. A., Influence of Composition and Texture on the Failure Properties of Clastic Rocks, Eurock '94, 1994.

(6) Press, W. H., Teukolsky, S. A., Vetterling, W. T. and Flannery, B. P. (1992) Numerical Recipes in Fortran: Cambridge University Press, Cambridge, UK.

(7) Sayers, C. M., 2002, Stress-dependent elastic anisotropy of sandstones: Geophysical Prospecting, 50, 85-95.

(8) Sayers, C. M., 2005, Sensitivity of elastic-wave velocities to stress changes in sandstones: The Leading Edge, December 2005, 1262-1266.

(9) Sayers, C. M., 2006, Effects of borehole stress concentration on elastic wave velocities in sandstones: 76th Annual International Meeting, SEG, Expanded Abstracts.

(10) Sayers, C. M., and M. Kachanov, 1991, A simple technique for finding effective elastic constants of cracked solids for arbitrary crack orientation statistics: International Journal of Solids and Structures, 12, 81-97.

(11) Sayers, C. M., and M. Kachanov, 1995, Microcrack-induced elastic wave anisotropy of brittle rocks: Journal of Geophysical Research, 100, 4149-4156.

(12) Schoenberg, M., 2002. Time-dependent anisotropy induced by pore pressure variation in fractured rock. J. Seis. Expl. 11, 83-105.

(13) Schoenberg, M., and Sayers, C. M. 1995. Seismic anisotropy of fractured rock. Geophysics 60, 204-211.

(14) Sinha, B. K. (1998) Method for estimating formation in-situ stress magnitudes using a sonic borehole tool, U.S. Pat. No. 5,838,633.

(15) Sinha, B. K. (2002) Determining stress parameters of formations from multi-mode velocity data, U.S. Pat. No. 6,351,991.

(16) Sinha, B. K. (2006) Determination of stress characteristics of earth formations, U.S. Pat. No. 7,042,802.

Theoretical Model

Figure 16:
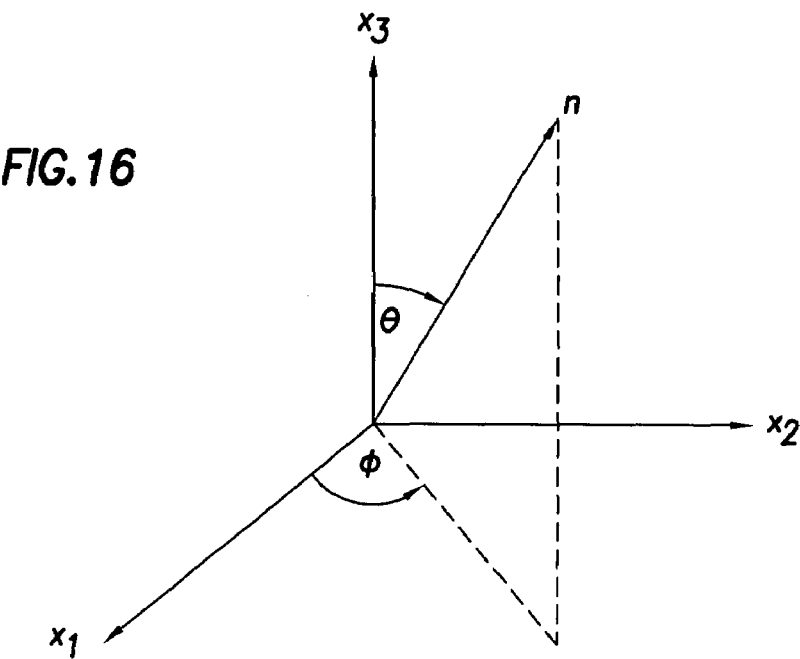
FIG. 16 illustrates an orientation of the normal, n, to a grain boundary specified by polar angle $\theta$ and azimuthal angle $\phi$.
Figure 17:
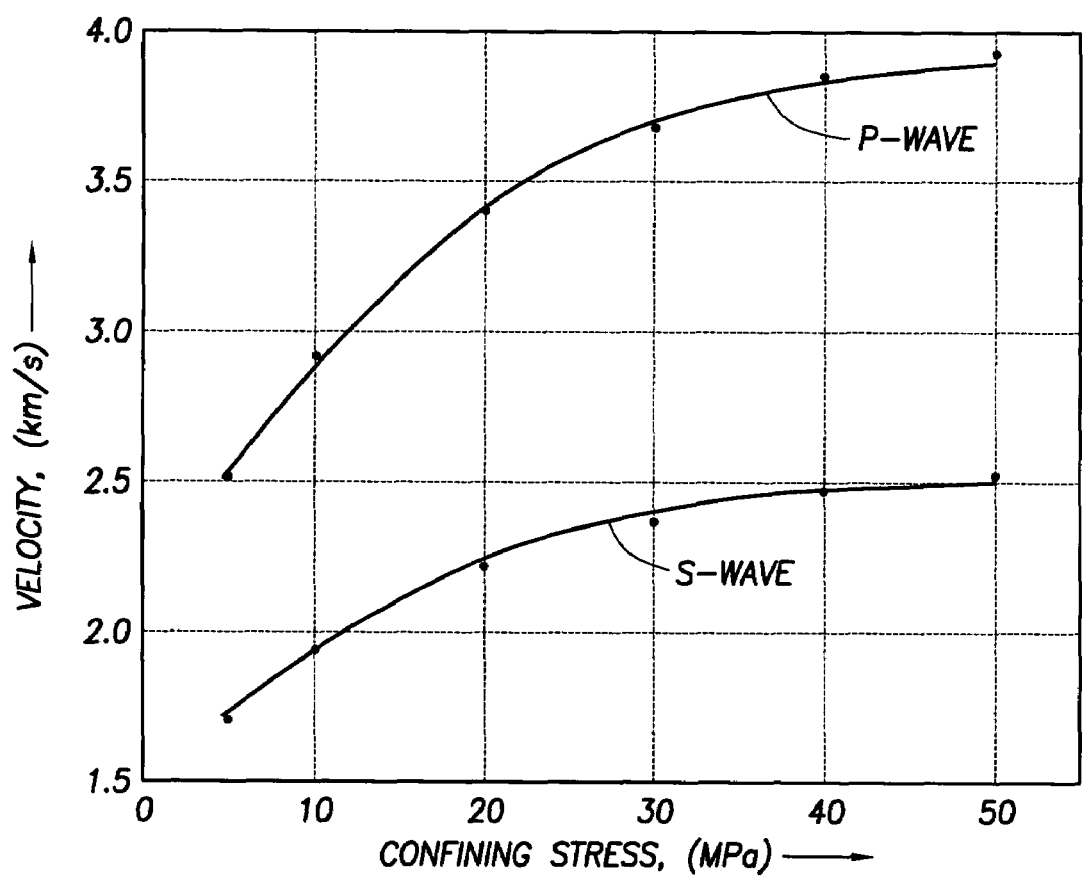
FIG. 17 illustrates measured ultrasonic P- and S-wave velocities in a room-dry Gulf of Mexico sandstone as a function of increasing hydrostatic stress, the curves showing a fit of equations (2-4) using the exponential variation of equation (9).

Refer now to FIGS. 16 and 17.

It is assumed that the elastic wave velocities are a function of the effective stress tensor, $\sigma_{ij}$, which is assumed to be given in terms of the total stress tensor, $S_{ij}$, and the pore pressure, p, by $$\sigma_{ij}=S_{ij}-\eta p\delta_{ij}, \quad (A1)$$

where $\eta$ is the Biot-Willis parameter, $\delta_{ij}$ is the Kronecker delta, and $\delta_{ij}=1$ if i=j and 0 otherwise. Elastic wave velocities in sandstones vary with changes in effective stress due to the presence of stress-sensitive grain boundaries within the rock. Sayers and Kachanov (1991, 1995) show that the elastic compliance tensor, $s_{ijkl}$, of a sandstone may be written in the form $$s_{ijkl}=s_{ijkl}^{\infty}+\Delta s_{ijkl}, \quad (A2)$$

where $s_{ijkl}^{\infty}$ is the compliance the rock would have if the grains formed a continuous network, and $\Delta s_{ijkl}$ is the excess compliance due to the presence of grain boundaries in the rock. $\Delta s_{ijkl}$ can be written as $$\Delta s_{ijkl} = \frac{1}{4}(\delta_{ik}\alpha_{jl}+\delta_{il}\alpha_{jk}+\delta_{jk}\alpha_{il}+\delta_{jl}\alpha_{ik})+\beta_{ijkl}, \quad (A3)$$

where $\alpha_{ij}$ is a second-rank tensor and $\beta_{ijkl}$ is a fourth-rank tensor defined by $$\alpha_{ij} = \frac{1}{V}\sum_r B_T^{(r)} n_i^{(r)} n_j^{(r)} A^{(r)}, \quad (A4)$$

$$\beta_{ijkl} = \frac{1}{V}\sum_r (B_N^{(r)}-B_T^{(r)}) n_i^{(r)} n_j^{(r)} n_k^{(r)} n_l^{(r)} A^{(r)}. \quad (A5)$$

Here, the summation is over all grain contacts within volume V. $B_N^{(r)}$ and $B_T^{(r)}$ are the normal and shear compliance of the rth grain boundary, $n_i^{(r)}$ is the ith component of the normal to the grain boundary, and $A^{(r)}$ is the area of the grain boundary (Sayers and Kachanov, 1991, 1995). If the normal and shear compliance of the discontinuities are equal, it follows from equation (A5) that the fourth-rank tensor $\beta_{ijkl}$ vanishes, and the elastic stiffness tensor is a function only of $\alpha_{ij}$. This is a reasonable approximation for the grain contacts in sandstones (Sayers, 2002) and will be assumed in the following.

Following Mavko et al. (1995) and Schoenberg (2002), it is assumed that the normal and shear compliance of a grain boundary are functions only of the component of the effective stress acting normal to the plane of the boundary given by $\sigma_n=n_i\sigma_{ij}n_j$, where a sum over repeated indices is implied. The components of the normal n to a grain boundary or microcrack can be written in terms of polar angle $\theta$ and azimuthal angle $\phi$ shown in figure A1:

$$n_1=\cos\phi\sin\theta, n_2=\sin\phi\sin\theta \text{ and } n_3=\cos\theta. \quad (A6)$$

Refer to FIG. 16 illustrating an orientation of the normal, n, to a grain boundary specified by polar angle $\theta$ and azimuthal angle $\phi$.

Assuming a continuous orientation distribution of microcracks and grain boundaries, it follows from equation (A4) that $\alpha_{ij}$, may be written in the form $$\alpha_{ij} = \int_{\theta=0}^{\pi/2}\int_{\phi=0}^{2\pi} Z(\theta,\phi) n_i n_j \sin\theta d\theta d\phi \quad (A7)$$

where $Z(\theta, \phi)\sin\theta d\theta d\phi$ represents the compliance of all microcracks and grain boundaries with normals in the angular range between $\theta$ and $\theta+d\theta$ and $\phi$ and $\phi+d\phi$ (Schoenberg and Sayers, 1995; Schoenberg, 2002) in a reference frame $X_1X_2X_3$ with axis $X_3$ aligned with the normal to the grain boundary. Because the compliance of a grain boundary is a function of the effective stress acting on the plane of the grain boundary, $\alpha_{ij}$ will be anisotropic, even for an initially isotropic orientation distribution of microcracks or grain boundaries.

Han (1986) measured compressional and shear wave velocities on 24 room-dry Gulf of Mexico sandstones; the results for the sample with the greatest stress sensitivity is shown in FIG. A2. The rate of increase in velocity with increasing stress decreases with increasing stress. This is consistent with the expected decrease in the compliance of the grain boundaries as the stress is increased due to increasing contact between opposing faces of the grain boundary. Following Schoenberg (2002), it is assumed that the compliance of the grain boundaries decreases exponentially with increasing stress applied normal to the grain boundaries as follows:

$$Z=Z_0 e^{-\sigma_n/\sigma_c} \quad (A8)$$

where $\sigma_c$ is a characteristic stress that determines the rate of decrease.

Refer to FIG. 17 illustrating measured ultrasonic P- and S-wave velocities in a room-dry Gulf of Mexico sandstone as a function of increasing hydrostatic stress (Han, 1986). The curves show a fit of equations (2-4) using the exponential variation of equation (9).

The elastic stiffness tensor can be found by inverting the compliance tensor given by equations (A2-A4). This allows the elastic wave velocities to be calculated. The curves in FIG. A2 show a fit of the theory to the data shown using equation (A8) and neglecting the contribution of $\beta_{ijkl}$. The exponential form of equation (A8) gives a good fit to the data and yields the following parameters: $\sigma_c$=10.3 MPa and $\mu Z_0$=0.438, where $\mu$ is the shear modulus at a confining stress of 50 MPa. The average values of $\sigma_c$ and $\mu Z_0$ for the 24 room-dry Gulf of Mexico sandstones studied by Han (1986) are $\sigma_c$=10.13 MPa and $\mu Z_0$=0.2583 respectively.

A perturbation theory can be obtained by writing $\sigma_n=\sigma_n^{(0)}+\Delta\sigma_n$, where $\sigma_n^{(0)}$ is the value of $\sigma_n$ in the initial state of the reservoir, and $\Delta\sigma_n$ is the change in $\sigma_n$ due to production. It follows that, for small changes in stress, $$Z(\sigma_n)\approx Z^{(0)}+Z^{(1)}\Delta\sigma_n, \quad (A9)$$

where $Z^{(0)}=Z(\sigma_n^{(0)})$, and $Z^{(1)}$ is the first derivative of z with respect to $\sigma_n$, evaluated at $\sigma_n^{(0)}$. The non-vanishing components of the change $\Delta\alpha_{ij}$ in $\alpha_{ij}$ are $\Delta\alpha_{11}$, $\Delta\alpha_{22}$, and $\Delta\alpha_{33}$, given by $$\Delta\alpha_{11} = \frac{2\pi}{15}(3\Delta\sigma_1+\Delta\sigma_2+\Delta\sigma_3)Z_T^{(1)}, \quad (A10)$$

$$\Delta\alpha_{22} = \frac{2\pi}{15}(\Delta\sigma_1+3\Delta\sigma_2+\Delta\sigma_3)Z_T^{(1)}, \quad (A11)$$

$$\Delta\alpha_{33} = \frac{2\pi}{15}(\Delta\sigma_1+\Delta\sigma_2+3\Delta\sigma_3)Z_T^{(1)}, \quad (A12)$$

from which the change in the elastic stiffness tensor can be calculated. It is found that for small changes in stress, the velocity of a vertically propagating compressional wave depends on the change in the radial and hoop stress only through the combination $\Delta\sigma_{rr}+\Delta\sigma_{\phi\phi}$, and that the velocity of a vertically propagating, radially polarized, shear wave depends on the change in the vertical, radial and hoop stress only through the combination $2(\Delta\sigma_{rr}+\Delta\sigma_{zz})+\Delta\sigma_{\phi\phi}$. The velocity of a vertically propagating, radially polarized, shear wave is seen to be more sensitive to changes in the vertical and radial stress than to changes in the hoop stress.

This specification discusses using velocity or slowness versus radius; however, velocity or slowness versus frequency can also be used which is what is actually measured by the Sonic Scanner. Velocity versus frequency can be calculated from velocity versus radius, and velocity versus frequency can be inverted to give velocity versus radius following the methods disclosed in the patents of Sinha.

The above description of the 'Rock Strength determination software' disclosed in this specification includes a method described in the 'Theoretical Model' for calculating velocity as a function of stress using methods developed by Sayers and Kachanov. However, the 'Rock Strength determination software' disclosed in this specification also includes a method involving the calculation of the stress tensor from and around the borehole for a given choice of geomechanical parameters, and the minimization of the 'cost function' equation to determine optimal values of the geomechanical parameters for later calculations.

The above description of the 'Rock Strength Determination Software' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

I claim:

1. A method for determining a rock strength of an Earth formation, comprising:
    receiving a signal from a Sonic Scanner tool representing a measured variation of velocities or slownesses as function of radius from and azimuth around a borehole;
    in response to said signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness;
    changing the rock strength in the rock strength model of the Mechanical Earth Model until the further prediction substantially matches said measured variation in velocity around and from the borehole; and
    on the condition that the further prediction substantially matches the measured variation in velocity around and from the borehole, generating a set of parameters, wherein said parameters are used to populate the MEM and are used in subsequent calculations.

2. The method of claim 1, wherein said signal representing a measured variation of velocities or slownesses as a function of radius from and azimuth around a borehole is generated by a sonic scanner tool.

3. The method of claim 1, wherein said set of parameters include unconfined compressive strength.

4. The method of claim 1, wherein said set of parameters include friction angle.

5. The method of claim 1, wherein said set of parameters include one or more geomechanical parameters.

6. The method of claim 1, wherein the changing step, adapted for changing the rock strength in the rock strength model of the Mechanical Earth Model until the predictions substantially match said measured variation in velocity around and from the borehole, comprises:
    determining a first estimate of unconfined compressive strength and friction angle and other geomechanical parameters using correlations between log measurements and geomechanical properties.

7. The method of claim 6, wherein the changing step further comprises:
    determining a second estimate of a far field stress and pore pressure using a geomechanical workflow.

8. The method of claim 7, wherein the changing step further comprises:
    providing the first estimate and the second estimate and a borehole geometry to a computational model that is capable of predicting rock yield and failure, and
    calculating a stress distribution variation with radius and azimuth around the borehole.

9. The method of claim 8, wherein the changing step further comprises:
    in response to said stress distribution, computing a variation in compressional, fast and slow shear, and Stoneley velocities or slownesses around the borehole, said variation in compressional, fast and slow shear, and Stoneley velocities or slownesses around the borehole being said predictions representing a predicted variation of velocities or slownesses.

10. The method of claim 9, wherein said signal representing a measured variation of velocities or slownesses as a function of radius from and azimuth around a borehole is generated by a sonic scanner tool.

11. The method of claim 10, wherein said set of parameters include unconfined compressive strength.

12. The method of claim 11, wherein said set of parameters include friction angle.

13. The method of claim 12, wherein said set of parameters include one or more geomechanical parameters.

14. A computer readable medium for storing a computer program adapted to be executed by a processor, said computer program, when executed by the processor, conducting a process for determining a rock strength of an Earth formation, said process comprising:
    receiving a signal representing a measured variation of velocities or slownesses as a function of radius from and azimuth around a borehole;
    in response to said signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness;
    changing the rock strength in the rock strength model of the Mechanical Earth Model until the further prediction substantially matches said measured variation in velocity around and from the borehole; and
    on the condition that the further prediction substantially matches the measured variation in velocity around and from the borehole, generating a set of parameters, wherein said parameters are used to populate the MEM and are used in subsequent calculations.

15. The computer readable medium of claim 14, wherein said signal representing a measured variation of velocities or slownesses as a function of radius from and azimuth around a borehole is generated by a sonic scanner tool.

16. The computer readable medium of claim 14, wherein said set of parameters include unconfined compressive strength.

17. The computer readable medium of claim 14, wherein said set of parameters include friction angle.

18. The computer readable medium of claim 14, wherein said set of parameters include one or more geomechanical parameters.

19. The computer readable medium of claim 14, wherein the changing step, adapted for changing the rock strength in the rock strength model of the Mechanical Earth Model until the predictions substantially match said measured variation in velocity around and from the borehole, comprises:
   determining a first estimate of unconfined compressive strength and friction angle and other geomechanical parameters using correlations between log measurements and geomechanical properties.

20. The computer readable medium of claim 19, wherein the changing step further comprises:
   determining a second estimate of a far field stress and pore pressure using a geomechanical workflow.

21. The computer readable medium of claim 20, wherein the changing step further comprises:
   providing the first estimate and the second estimate and a borehole geometry to a computational model that is capable of predicting rock yield and failure, and
   calculating a stress distribution variation with radius and azimuth around the borehole.

22. The computer readable medium of claim 21, wherein the changing step further comprises:
   in response to said stress distribution, computing a variation in compressional, fast and slow shear, and Stoneley velocities or slownesses around the borehole, said variation in compressional, fast and slow shear, and Stoneley velocities or slownesses around the borehole being said predictions representing a predicted variation of velocities or slownesses.

23. The computer readable medium of claim 22, wherein said signal representing a measured variation of velocities or slownesses as a function of radius from and azimuth around a borehole is generated by a sonic scanner tool.

24. The computer readable medium of claim 23, wherein said set of parameters include unconfined compressive strength.

25. The computer readable medium of claim 24, wherein said set of parameters include friction angle.

26. The computer readable medium of claim 25, wherein said set of parameters include one or more geomechanical parameters.

27. A program storage device readable by a machine, tangibly embodying a set of instructions executable by the machine, to perform method steps for determining a rock strength of an Earth formation, said method steps comprising:
   receiving a signal representing a measured variation of velocities or slownesses as a function of radius from and azimuth around a borehole;
   in response to said signal, generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness;
   changing the rock strength in the rock strength model of the Mechanical Earth Model until the further prediction substantially matches said measured variation in velocity around and from the borehole; and
   on the condition that the further prediction substantially matches the measured variation in velocity around and from the borehole, generating a set of parameters, wherein said parameters are used to populate the MEM and are used in subsequent calculations.

28. The program storage device of claim 27, wherein said signal representing a measured variation of velocities or slownesses as a function of radius from and azimuth around a borehole is generated by a sonic scanner tool.

29. The program storage device of claim 27, wherein said set of parameters include unconfined compressive strength.

30. The program storage device of claim 27, wherein said set of parameters include friction angle.

31. The program storage device of claim 27, wherein said set of parameters include one or more geomechanical parameters.

32. The program storage device of claim 27, wherein the changing step, adapted for changing the rock strength in the rock strength model of the Mechanical Earth Model until the predictions substantially match said measured variation in velocity around and from the borehole, comprises:
   determining a first estimate of unconfined compressive strength and friction angle and other geomechanical parameters using correlations between log measurements and geomechanical properties.

33. The program storage device of claim 32, wherein the changing step further comprises:
   determining a second estimate of a far field stress and pore pressure using a geomechanical workflow.

34. The program storage device of claim 33, wherein the changing step further comprises:
   providing the first estimate and the second estimate and a borehole geometry to a computational model that is capable of predicting rock yield and failure, and
   calculating a stress distribution variation with radius and azimuth around the borehole.

35. The program storage device of claim 34, wherein the changing step further comprises:
   in response to said stress distribution, computing a variation in compressional, fast and slow shear, and Stoneley velocities or slownesses around the borehole, said variation in compressional, fast and slow shear, and Stoneley velocities or slownesses around the borehole being said predictions representing a predicted variation of velocities or slownesses.

36. The program storage device of claim 35, wherein said signal representing a measured variation of velocities or slownesses as a function of radius from and azimuth around a borehole is generated by a sonic scanner tool.

37. The program storage device of claim 36, wherein said set of parameters include unconfined compressive strength.

38. The program storage device of claim 37, wherein said set of parameters include friction angle.

39. The program storage device of claim 38, wherein said set of parameters include one or more geomechanical parameters.

40. A system adapted for determining a rock strength of an Earth formation, comprising:
   apparatus adapted for receiving a signal representing a measured variation of velocities or slownesses as a function of radius from and azimuth around a borehole;
   in response to said signal, apparatus adapted for generating predictions from a Mechanical Earth Model (MEM) representing predictions of a variation of stress and hence velocity as a function of distance from, and azimuth around, the borehole, the MEM including a rock strength model adapted for generating a further prediction representing a predicted variation of velocities or slowness;

apparatus adapted for changing the rock strength in the rock strength model of the Mechanical Earth Model until the further prediction substantially matches said measured variation in velocity around and from the borehole; and on the condition that the further prediction substantially matches the measured variation in velocity around and from the borehole, apparatus adapted for generating a set of parameters, wherein said parameters are used to populate the MEM and are used in subsequent calculations.

41. The system of claim 40, wherein the apparatus adapted for changing the rock strength in the rock strength model of the Mechanical Earth Model until the predictions substantially match said measured variation in velocity around and from the borehole, comprises:

apparatus adapted for determining a first estimate of unconfined compressive strength and friction angle and other geomechanical parameters using correlations between log measurements and geomechanical properties.

42. The system of claim 41, wherein the apparatus adapted for changing the rock strength in the rock strength model of the Mechanical Earth Model until the predictions substantially match said measured variation in velocity around and from the borehole further comprises:

apparatus adapted for determining a second estimate of a far field stress and pore pressure using a geomechanical workflow.

43. The system of claim 42, wherein the apparatus adapted for changing the rock strength in the rock strength model of the Mechanical Earth Model until the predictions substantially match said measured variation in velocity around and from the borehole further comprises:

apparatus adapted for providing the first estimate and the second estimate and a borehole geometry to a computational model that is capable of predicting rock yield and failure, and apparatus adapted for calculating a stress distribution variation with radius and azimuth around the borehole.

44. The system of claim 43, wherein the apparatus adapted for changing the rock strength in the rock strength model of the Mechanical Earth Model until the predictions substantially match said measured variation in velocity around and from the borehole further comprises:

in response to said stress distribution, apparatus adapted for computing a variation in compressional, fast and slow shear, and Stoneley velocities or slownesses around the borehole, said variation in compressional, fast and slow shear, and Stoneley velocities or slownesses around the borehole being said predictions representing a predicted variation of velocities or slownesses.

45. The system of claim 44, wherein said signal representing a measured variation of velocities or slownesses as a function of radius from and azimuth around a borehole is generated by a sonic scanner tool.

46. The system of claim 45, wherein said set of parameters include unconfined compressive strength.

47. The system of claim 46, wherein said set of parameters include friction angle.

48. The system of claim 47, wherein said set of parameters include one or more geomechanical parameters.

* * * * *